United States Patent
Cardente et al.

(10) Patent No.: US 12,197,461 B2
(45) Date of Patent: Jan. 14, 2025

(54) DISTRIBUTED FUNCTION DATA TRANSFORMATION SYSTEM

(71) Applicant: Dell Products L.P., Round Rock, TX (US)

(72) Inventors: John Cardente, Milford, MA (US); Gaurav Chawla, Austin, TX (US); John Harwood, Boston, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/066,586

(22) Filed: Dec. 15, 2022

(65) Prior Publication Data

US 2024/0202207 A1 Jun. 20, 2024

(51) Int. Cl.
*G06F 16/25* (2019.01)
(52) U.S. Cl.
CPC .................................. *G06F 16/258* (2019.01)
(58) Field of Classification Search
CPC ................................................... G06F 16/258
See application file for complete search history.

(56) References Cited

U.S. PATENT DOCUMENTS 8,832,331 B2 9/2014 Co

FOREIGN PATENT DOCUMENTS

EP 4057158 A1 * 9/2022 ........... G06F 16/258

* cited by examiner

*Primary Examiner* — Mark D Featherstone
*Assistant Examiner* — Ranjit P Doraiswamy
(74) *Attorney, Agent, or Firm* — Joseph Mencher

(57) ABSTRACT

A distributed function data transformation system includes a distributed function packet provisioning device coupled to compute systems. The distributed function packet provisioning device receives a request to perform a data transformation including data transformation operations, and determines a respective function for performing each data transformation operation. The distributed function packet provisioning device generates a distributed function packet including a function list identifying the respective functions, a data identifier identifying data upon which the respective functions should be performed, and a function performance identifier configured to identify one of the respective functions to perform on the data. The distributed function packet provisioning device then transmits the distributed function packet to a first compute system to cause it to perform a first function identified in the function list and transmit the distributed function packet to a second compute system to cause it to perform a second function identified in the function list.

20 Claims, 28 Drawing Sheets

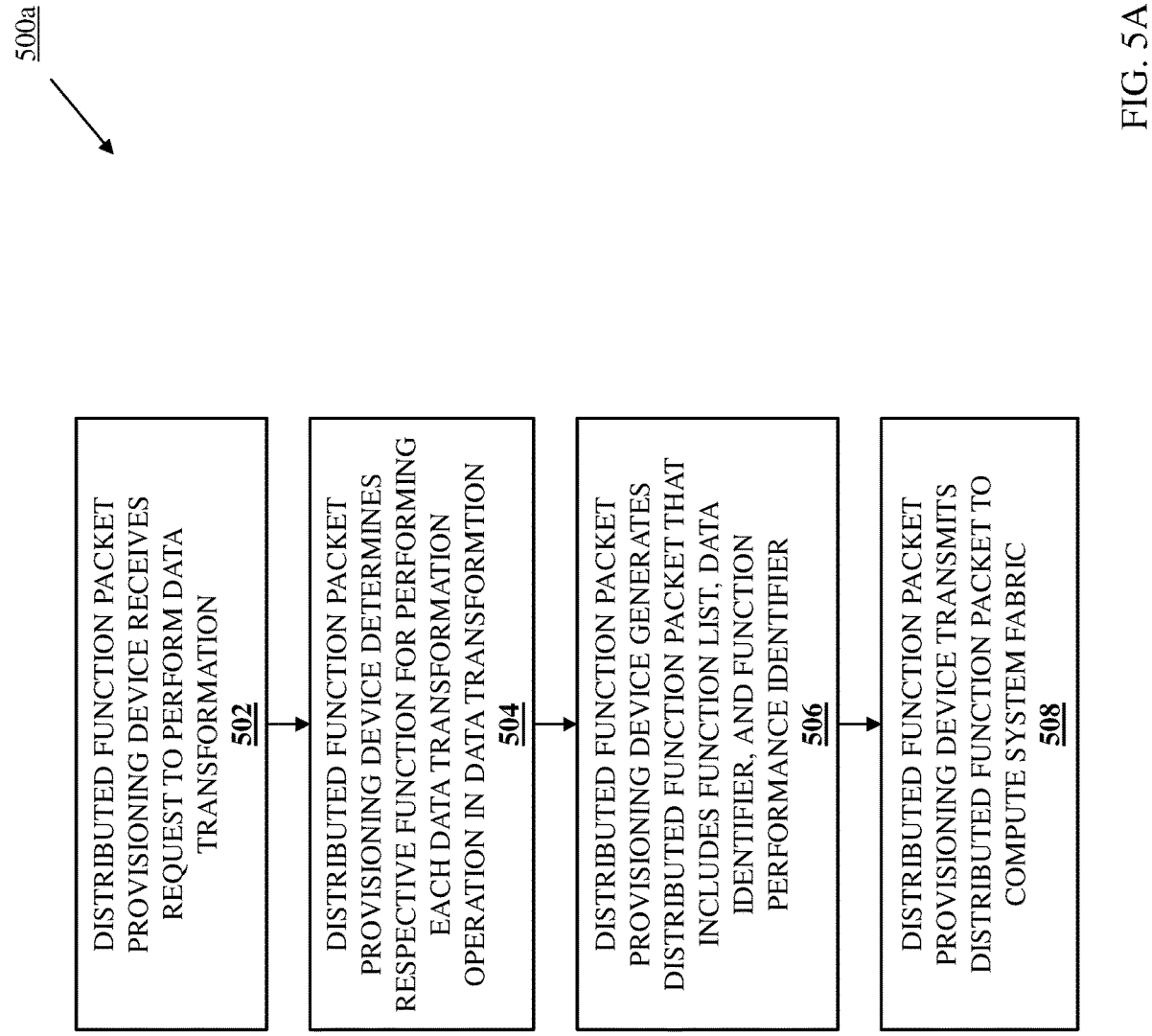

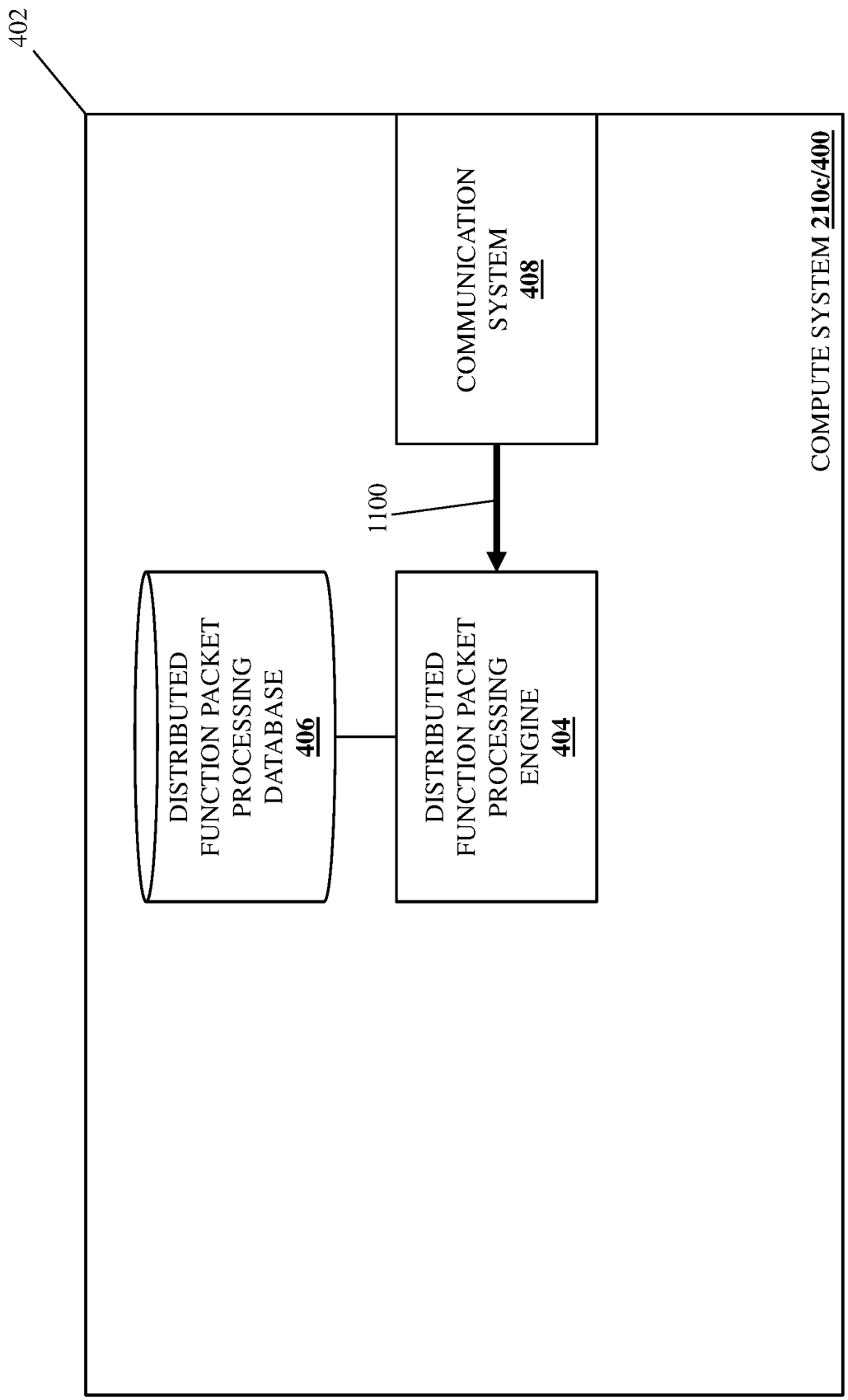

DISTRIBUTED FUNCTION DATA TRANSFORMATION SYSTEM

BACKGROUND

The present disclosure relates generally to information handling systems, and more particularly to performing functions to transform data using a plurality of different information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, desktop computing devices, laptop/notebook computing devices, tablet computing devices, mobile phones, and/or other computing devices known in the art, sometimes require the transformation of their data. In many situations, the transformation of data may include the performance of a plurality of different data transformation operations that provide for a data transformation. Conventional data transformation systems often perform such data transformations operations on a single compute system, but because each data transformation operation that provides for a data transformation may be optimally performed by different compute resources, the performance of that data transformation will often be sub-optimal.

Conventional solutions to such issues include providing for the performance of the data transformation operations for a data transformation on different compute systems. For example, such conventional solutions typically require a centralized orchestrator device to "call" a respective service for performing each data transformation operation in a data transformation by sending an instruction to the compute system providing that respective service that causes that compute system to retrieve data, process that data, and return that data, with those calls sequenced in order to transform the data as required by the data transformation. However, distributing the performance of data transformation operations for a data transformation across a fabric of interconnected, heterogenous compute systems is non-trivial, particularly when that fabric includes a large number of compute systems, and one of skill in the art in possession of the present disclosure will appreciate how the operations of the central orchestrator device described above are time consuming and inefficient, particular at scale.

Accordingly, it would be desirable to provide a data transformation system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a distributed function packet provisioning engine that is configured to: receive a request to perform a data transformation that includes a plurality of data transformation operations; determine a respective function for performing each of the plurality of data transformation operations; generate a distributed function packet that includes: a function list that identifies the respective functions; a data identifier identifying data upon which the respective functions should be performed; and a function performance identifier that is configured to identify one of the respective functions that should be performed on the data; transmit the distributed function packet to a first compute system that is configured to perform a first function that is identified in the function list, wherein the function performance identifier is configured to cause the first compute system to perform the first function on the data identified by the data identifier, and transmit the distributed function packet to a second compute system that is configured to perform a second function that is identified in the function list, and wherein the function performance identifier is configured to cause the second compute system to perform the second function on the data identified by the data identifier.

BRIEF DESCRIPTION OF THE DRAWINGS

FIG. 5A is a flow chart illustrating an embodiment of a portion of a method for transforming data using distributed functions.

FIG. 11E is a schematic view illustrating an embodiment of the compute system of FIG. 4 operating during the method of FIGS. 5A and 5B.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
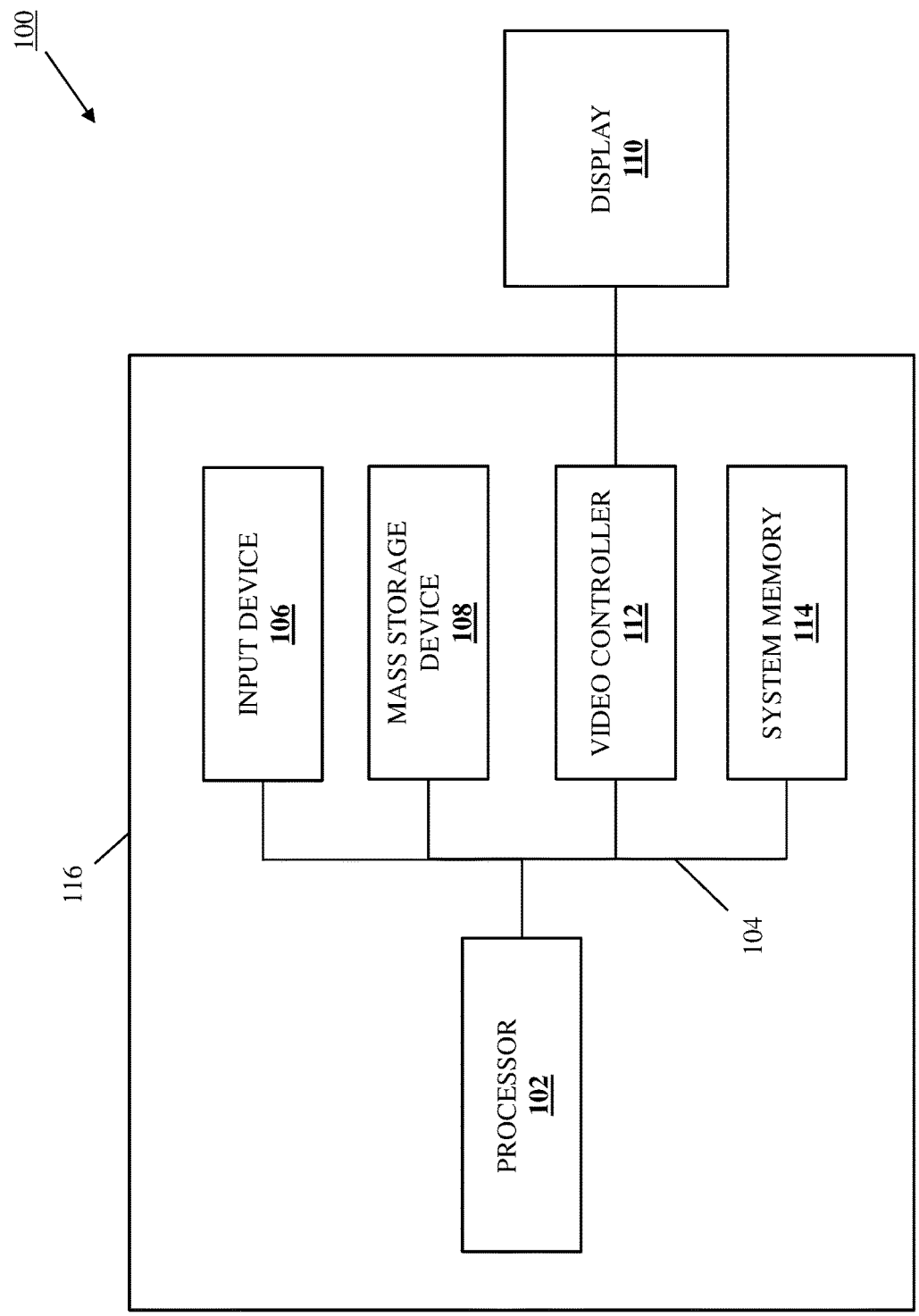
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
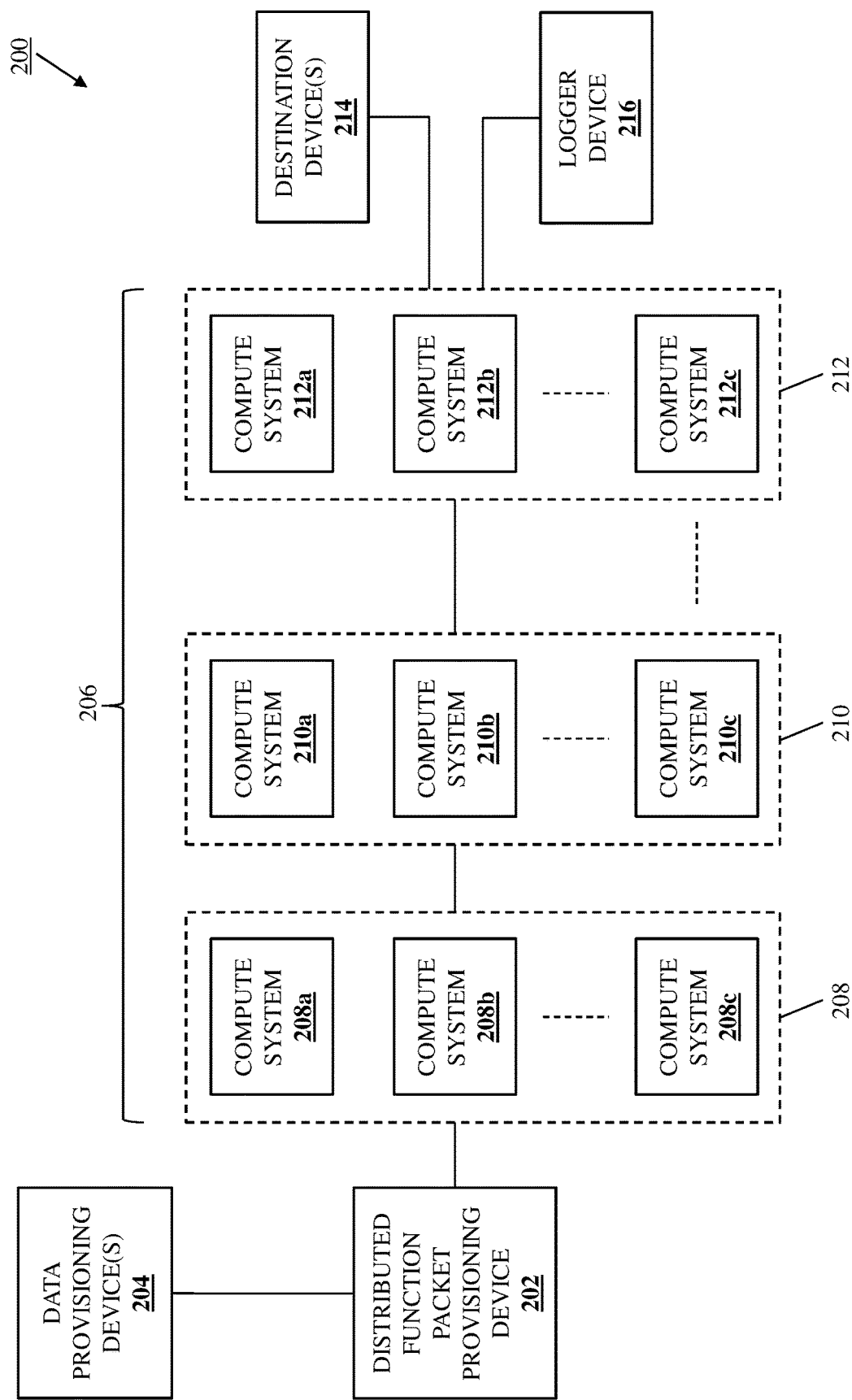
FIG. 2 is a schematic view illustrating an embodiment of a distributed function data transformation system provided according to the teachings of the present disclosure.

Referring now to FIG. 2, an embodiment of a distributed function data transformation system 200 is illustrated that may be provided according to the teachings of the present disclosure. In the illustrated embodiment, the distributed function data transformation system 200 includes a distributed function packet provisioning device 202. In an embodiment, the distributed function packet provisioning device 202 may be provided by the IHS 100 discussed above with reference to FIG. 1, and/or may include some or all of the components of the IHS 100, and in specific examples may be provided by a server device. However, while illustrated and discussed as being provided by a server device, one of skill in the art in possession of the present disclosure will recognize that distributed function packet provisioning devices provided in the distributed function data transformation system 200 may include any devices that may be configured to operate similarly as the distributed function packet provisioning device 202 discussed below.

In the illustrated embodiment, the distributed function data transformation system 200 includes one or more data provisioning devices 204 that are coupled to the distributed function packet provisioning device 202, and while the data provisioning device(s) 204 are illustrated as being directly coupled to the distributed function packet provisioning device 202, one of skill in the art in possession of the present disclosure will appreciate how the data provisioning device(s) 204 may be coupled to the distributed function packet provisioning device 202 via a network (e.g., a Local Area Network (LAN), the Internet, combinations thereof, and/or other networks known in the art) while remaining within the scope of the present disclosure as well. In an embodiment, the data provisioning device(s) 204 may be provided by the IHS 100 discussed above with reference to FIG. 1, and/or may include some or all of the components of the IHS 100, and in specific examples may be provided by server devices, desktop computing devices, laptop/notebook computing devices, tablet computing devices, mobile phones, and/or other computing devices that one of skill in the art in possession of the present disclosure would appreciate are configured to provide the data discussed below. However, while illustrated and discussed as being provided by particular computing devices, one of skill in the art in possession of the present disclosure will recognize that data provisioning devices provided in the distributed function data transformation system 200 may include any devices that may be configured to operate similarly as the data provisioning device(s) 204 discussed below.

In the illustrated embodiment, the distributed function data transformation system 200 also includes a compute system fabric 206 that is coupled to the distributed function packet provisioning device 202, and while the compute system fabric 206 is illustrated as being directly coupled to the distributed function packet provisioning device 202, one of skill in the art in possession of the present disclosure will appreciate how any of the compute systems include in the compute system fabric 206 may be coupled to the distributed function packet provisioning device 202 via a network (e.g., a LAN, the Internet, combinations thereof, and/or other networks known in the art) while remaining within the scope of the present disclosure as well. In the examples provided below, the compute system fabric 206 is illustrated and described as including a first compute system fabric portion 208 having a plurality of compute systems 208*a*, 208*b*, and up to 208*c*; a second compute system fabric portion 210 having a plurality of compute systems 210*a*, 210*b*, and up to 210*c*; and up to a third compute system fabric portion 212 having a plurality of compute systems 212*a*. 212*b*, and up to 212*c*. However, one of skill in the art in possession of the present disclosure will appreciate how the compute system fabric portions 208, 210, and 212 in the compute system fabric 206 illustrated and described below may be dynamic with regard to the compute systems included therein, and thus the compute systems included in each compute system fabric portion 208, 210, and 212 may change over time, while any particular compute system in the compute system fabric 206 may be included in multiple compute system fabric portions at different times.

In an embodiment, any or all of the compute systems 208*a*-208*c*, 210*a*-210*c*, and/or 212*a*-212*c* may be provided by the IHS 100 discussed above with reference to FIG. 1, and/or may include some or all of the components of the IHS 100, and in specific examples may be provided by (or included in) server devices. However, while illustrated and discussed as being provided by (or included in) server devices, one of skill in the art in possession of the present disclosure will recognize that compute systems provided in the distributed function data transformation system 200 may include any devices that may be configured to operate similarly as the compute systems 208*a*-208*c*, 210*a*-210*c*, and/or 212*a*-212*c* discussed below. In some embodiments, the compute systems 208*a*-208*c*, 210*a*-210*c*, and/or 212*a*-212*c* may include or be provided by different types of processing systems such as, for example, Central Processing Unit (CPU) processing systems, Graphics Processing Unit (GPU) processing systems, Field Programmable Gate Array (FPGA) processing systems, Data Processing Unit (DPU) processing systems, Network Interface Controller (NIC) processing systems or other packet processors, Application Specific Integrated Circuit (ASIC) processing systems, other hardware accelerator processing systems, and/or other types of processing systems that one of skill in the art in possession of the present disclosure would appreciate may be utilized by compute systems.

As described below, each of the compute systems 208*a*-208*c*. 210*a*-210*c*, and/or 212*a*-212*c* may be configured to perform at least one function. For example, the compute system fabric 206 may be configured as a Function as a Service (FaaS) fabric with the compute systems 208*a*-208*c*. 210*a*-210*c*, and/or 212*a*-212*c* configured as FaaS nodes that each perform one or more FaaS functions. As will be appreciated by one of skill in the art in possession of the present disclosure, FaaS functions (and/or other functions) performed by the compute systems 208*a*-208*c*. 210*a*-210*c*, and/or 212*a*-212*c* may include any operation on data that transforms that data as described below.

In a specific embodiment, data pipeline may be provided a plurality of functions that transform data, and any of those functions may be performed by one or more of the compute systems 208*a*-208*c*, 210*a*-210*c*, and/or 212*a*-212*c*. For example, a first function of the data pipeline may provide an ingest operation where data is processed and formatted for other operations (e.g., converting sensor data to localized aggregation data, performing transcoding and transmitting the transcoded data to another compute system for analysis and upstream processing, etc.). A second function of the data pipeline may then provide a local aggregation/analysis operation for upstream processing (e.g., when data is transmitted across a 5G wireless network and must be compressed for upstream processing at a next aggregation point in a data pipeline). A third function of the data pipeline may be performed by an upstream element may include decompressing the data and arranging that decompressed data for further processing (while similar communications may include a downstream element formatting the data for upstream processing in terms of data format and alignment). A fourth function of the data pipeline may provide an upstream aggregation to obtain results, format the data, and stream the data to an engine for aggregated analysis based on components and context. A fifth function of the data pipeline may then be performed by a downstream component and may provide models for analysis of the data that support the data formatting as well as the analytics functions based on the compute type and location in the data pipeline. A sixth function of the data pipeline may include tagging the data based on the locality and operation performed.

As such, each of the compute systems 208*a*-208*c*. 210*a*-210*c*, and/or 212*a*-212*c* in the compute system fabric 206 may each have been previously configured to perform any of the functions described above that may be "called" or otherwise requested for execution in any sequence. However, while specific examples of compute systems and their functions are described herein, one of skill in the art in possession of the present disclosure will appreciate how compute system may be configured to perform functions in other manners that will fall within the scope of the present disclosure as well.

In the illustrated embodiment, the distributed function data transformation system 200 also includes one or more destination devices 214 that are coupled to the compute system fabric 206. In an embodiment, any or all of the destination device(s) 214 may be provided by the IHS 100 discussed above with reference to FIG. 1, and/or may include some or all of the components of the IHS 100, and in specific examples may be provided by server devices, storage systems, desktop computing devices, laptop/notebook computing devices, tablet computing devices, mobile phones, and/or other computing devices that one of skill in the art in possession of the present disclosure would appreciate are configured to provide the data discussed below. However, while illustrated and discussed as being provided by computing devices and/or storage systems, one of skill in the art in possession of the present disclosure will recognize that destination devices provided in the distributed function data transformation system 200 may include any devices that may be configured to operate similarly as the destination device(s) 214 discussed below.

In the illustrated embodiment, the distributed function data transformation system 200 also includes a logger device 216 that is coupled to the compute system fabric 206. In an embodiment, the logger device 216 may be provided by the IHS 100 discussed above with reference to FIG. 1, and/or may include some or all of the components of the IHS 100, and in specific examples may be provided by a server device. However, while illustrated and discussed as being provided by a server device, one of skill in the art in possession of the present disclosure will recognize that logger devices provided in the distributed function data transformation system 200 may include any devices that may be configured to operate similarly as the logger device 216 discussed below. However, while a specific distributed function data transformation system 200 has been illustrated and described, one of skill in the art in possession of the present disclosure will recognize that the distributed function data transformation system of the present disclosure may include a variety of components and component configurations while remaining within the scope of the present disclosure as well.

Figure 3:
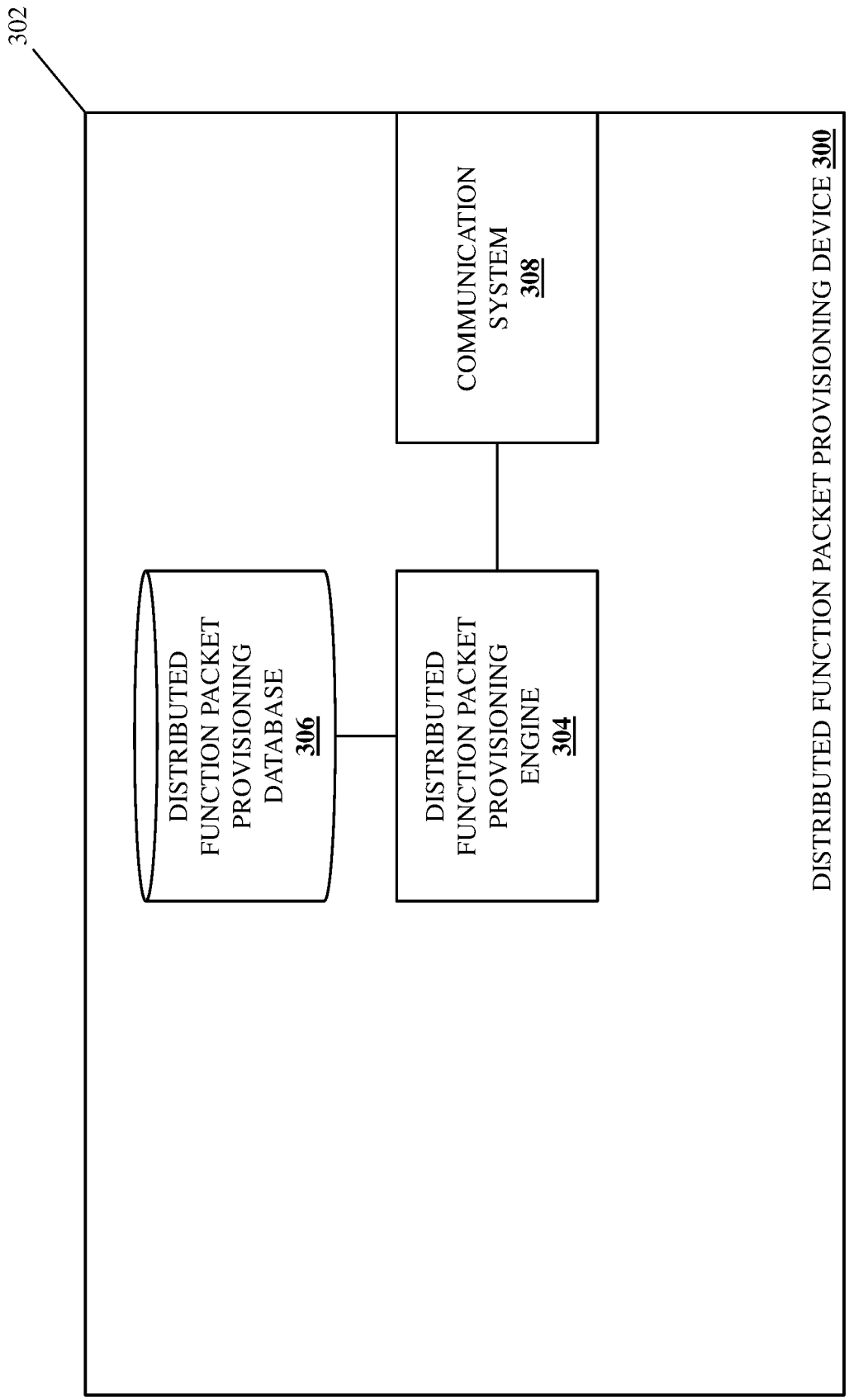
FIG. 3 is a schematic view illustrating an embodiment of a distributed function packet provisioning device that may be included in the distributed function data transformation system of FIG. 2.

Referring now to FIG. 3, an embodiment of a distributed function packet provisioning device 300 is illustrated that may provide the distributed function packet provisioning device 202 discussed above with reference to FIG. 2. As such, the distributed function packet provisioning device 300 may be provided by the IHS 100 discussed above with reference to FIG. 1 and/or may include some or all of the components of the IHS 100, and in specific examples may be provided by a server device. Furthermore, while illustrated and discussed as being provided by a server device, one of skill in the art in possession of the present disclosure will recognize that the functionality of the distributed function packet provisioning device 300 discussed below may be provided by other devices that are configured to operate similarly as the distributed function packet provisioning device 300 discussed below. In the illustrated embodiment, the distributed function packet provisioning device 300 includes a chassis 302 that houses the components of the distributed function packet provisioning device 300, only some of which are illustrated and discussed below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a distributed function packet provisioning engine 304 that is configured to perform the functionality of the distributed function packet provisioning engines and/or distributed function packet provisioning devices discussed below.

The chassis 302 may also house a storage system (not illustrated, but which may include the storage 108 discussed above with reference to FIG. 1) that is coupled to the distributed function packet provisioning engine 304 (e.g., via a coupling between the storage system and the processing system) and that includes a distributed function packet provisioning database 306 that is configured to store any of the information utilized by the distributed function packet provisioning engine 304 discussed below. The chassis 302 may also house a communication system 308 that is coupled to the distributed function packet provisioning engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific distributed function packet provisioning device 300 has been illustrated and described, one of skill in the art in possession of the present disclosure will recognize that distributed function packet provisioning devices (or other devices operating according to the teachings of the present disclosure in a manner similar to that described below for the distributed function packet provisioning device 300) may include a variety of components and/or component configurations for providing conventional functionality, as well as the functionality discussed below, while remaining within the scope of the present disclosure as well.

Figure 4:
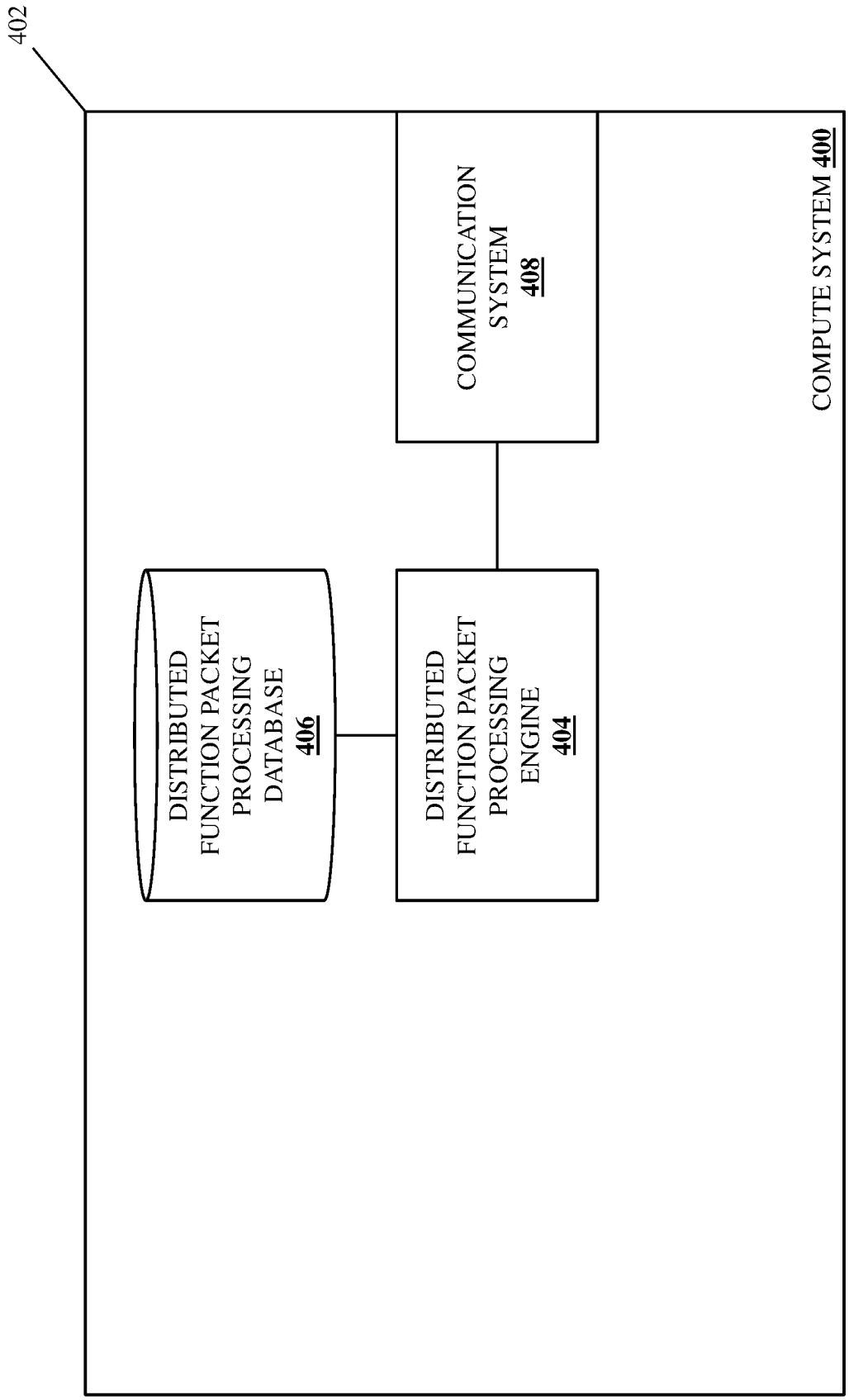
FIG. 4 is a schematic view illustrating an embodiment of a compute system that may be included in the distributed function data transformation system of FIG. 2.

Referring now to FIG. 4, an embodiment of a compute system 400 is illustrated that may provide any or all of the compute systems 208a-208c, 210a-210c, and 212a-212c discussed above with reference to FIG. 2. As such, the compute system 400 may be provided by the IHS 100 discussed above with reference to FIG. 1 and/or may include some or all of the components of the IHS 100, and in specific examples may be provided by a server device. Furthermore, while illustrated and discussed as being provided by a server device, one of skill in the art in possession of the present disclosure will recognize that the functionality of the compute system 400 discussed below may be provided by other devices that are configured to operate similarly as the compute system 400 discussed below. In the illustrated embodiment, the compute system 400 includes a chassis 402 that houses the components of the compute system 400, only some of which are illustrated and discussed below.

For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a distributed function packet processing engine 404 that is configured to perform the functionality of the distributed function packet processing engines and/or distributed function packet processing devices discussed below. As such, the distributed function packet processing engine 404 may include or be provided by different types of processing systems such as, for example, CPU processing systems, GPU processing systems, FPGA processing systems, DPU processing systems, NIC processing systems or other packet processors, ASIC processing systems, other hardware accelerator processing systems, and/or other types of processing systems that would be apparent to one of skill in the art in possession of the present disclosure. Furthermore, the distributed function packet processing engine 404 may be configured to perform at least one function such as, for example, FaaS functions (and/or other functions) that are configured to perform any operation on data that transforms that data as described below.

The chassis 402 may also house a storage system (not illustrated, but which may include the storage 108 discussed above with reference to FIG. 1) that is coupled to the distributed function packet processing engine 404 (e.g., via a coupling between the storage system and the processing system) and that includes a distributed function packet processing database 406 that is configured to store any of the information utilized by the distributed function packet processing engine 404 discussed below. The chassis 402 may also house a communication system 408 that is coupled to the distributed function packet processing engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific compute system 400 has been illustrated and described, one of skill in the art in possession of the present disclosure will recognize that the compute systems (or other devices operating according to the teachings of the present disclosure in a manner similar to that described below for the compute system 400) may include a variety of components and/or component configurations for providing conventional functionality, as well as the functionality discussed below, while remaining within the scope of the present disclosure as well.

Figure 5B:
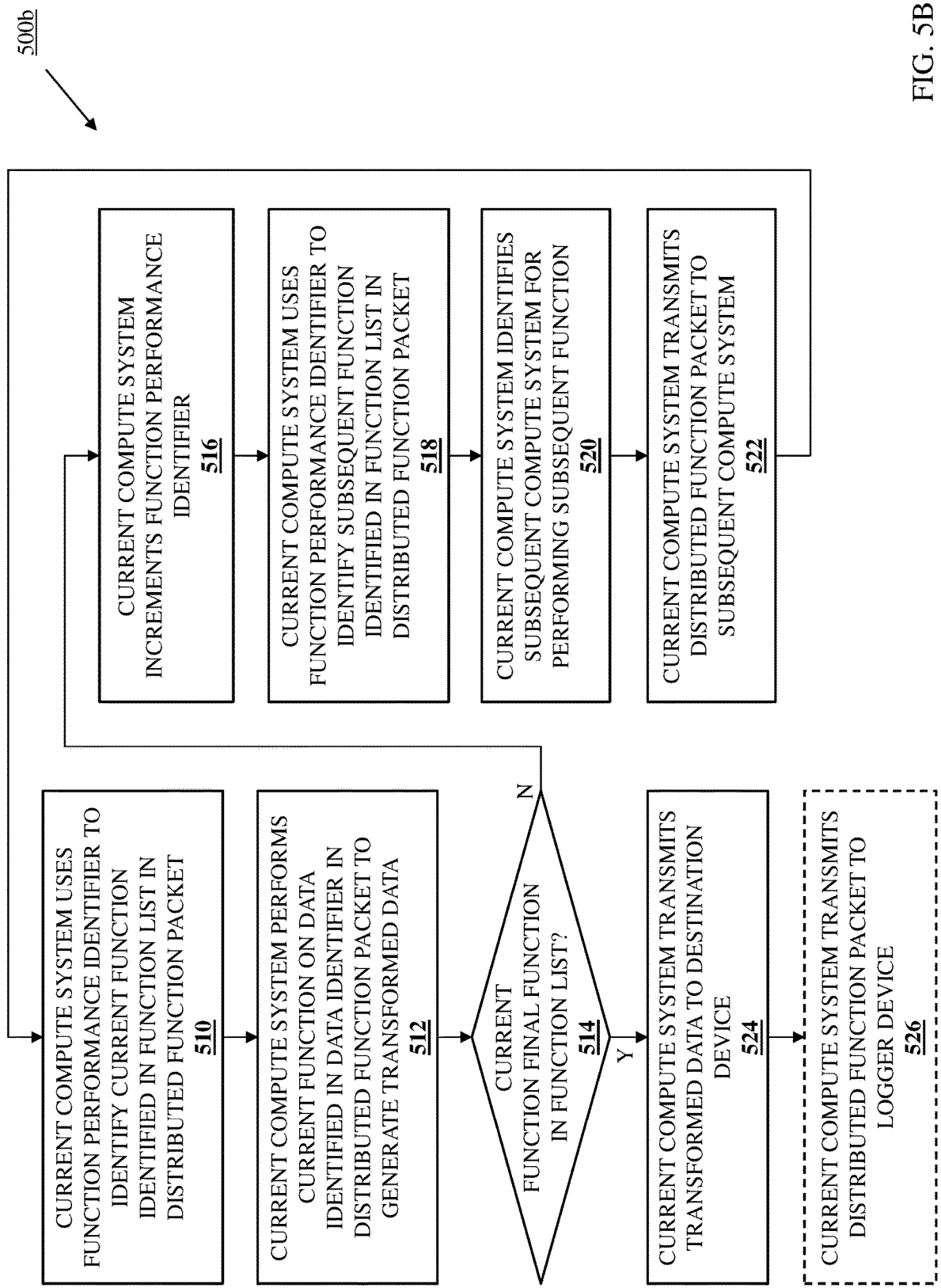
FIG. 5B is a flow chart illustrating an embodiment of a portion of a method for transforming data using distributed functions.

Referring now to FIGS. 5A and 5B, an embodiment of a methods 500a and 500b for transforming data using distributed functions is illustrated. As discussed below, the systems and methods of the present disclosure provide for the generation of a distributed function packet (or "work" packet) that distributes data transformation operations for performing a data transformation or other work on data between a plurality of compute systems, with that distributed function packet including data transformation information that allows each of those compute systems to perform one or more predefined functions associated with corresponding data transformation operations, and then forward the distributed function packet to another of the compute systems if required. For example, the distributed function data transformation system of the present disclosure may include a distributed function packet provisioning device coupled to compute systems. The distributed function packet provisioning device receives a request to perform a data transformation including data transformation operations, and determines a respective function for performing each data transformation operation. The distributed function packet provisioning device generates a distributed function packet including a function list identifying the respective functions, a data identifier identifying data upon which the respective functions should be performed, and a function performance identifier configured to identify one of the respective functions to perform on the data. The distributed function packet provisioning device then transmits the distributed function packet to a first compute system to cause it to perform a first function identified in the function list and transmit the distributed function packet to a second compute system to cause it to perform a second function identified in the function list. As such, work on data may be distributed between compute systems in an efficient and optimized manner that solves may issues with the conventional data transformation systems discussed above.

Figure 6A:
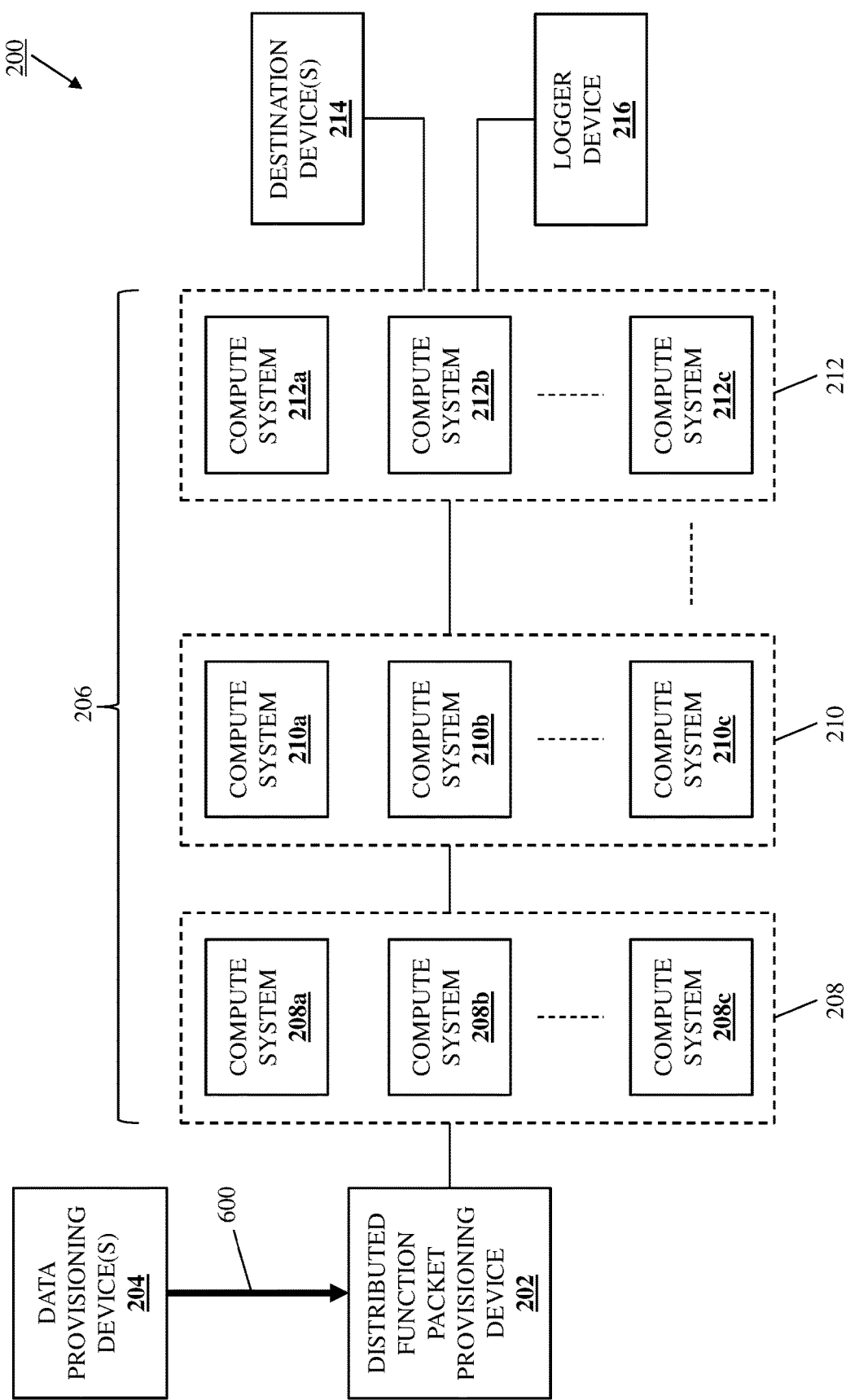
FIG. 6A is a schematic view illustrating an embodiment of the distributed function data transformation system of FIG. 2 operating during the method of FIGS. 5A and 5B.
Figure 6B:
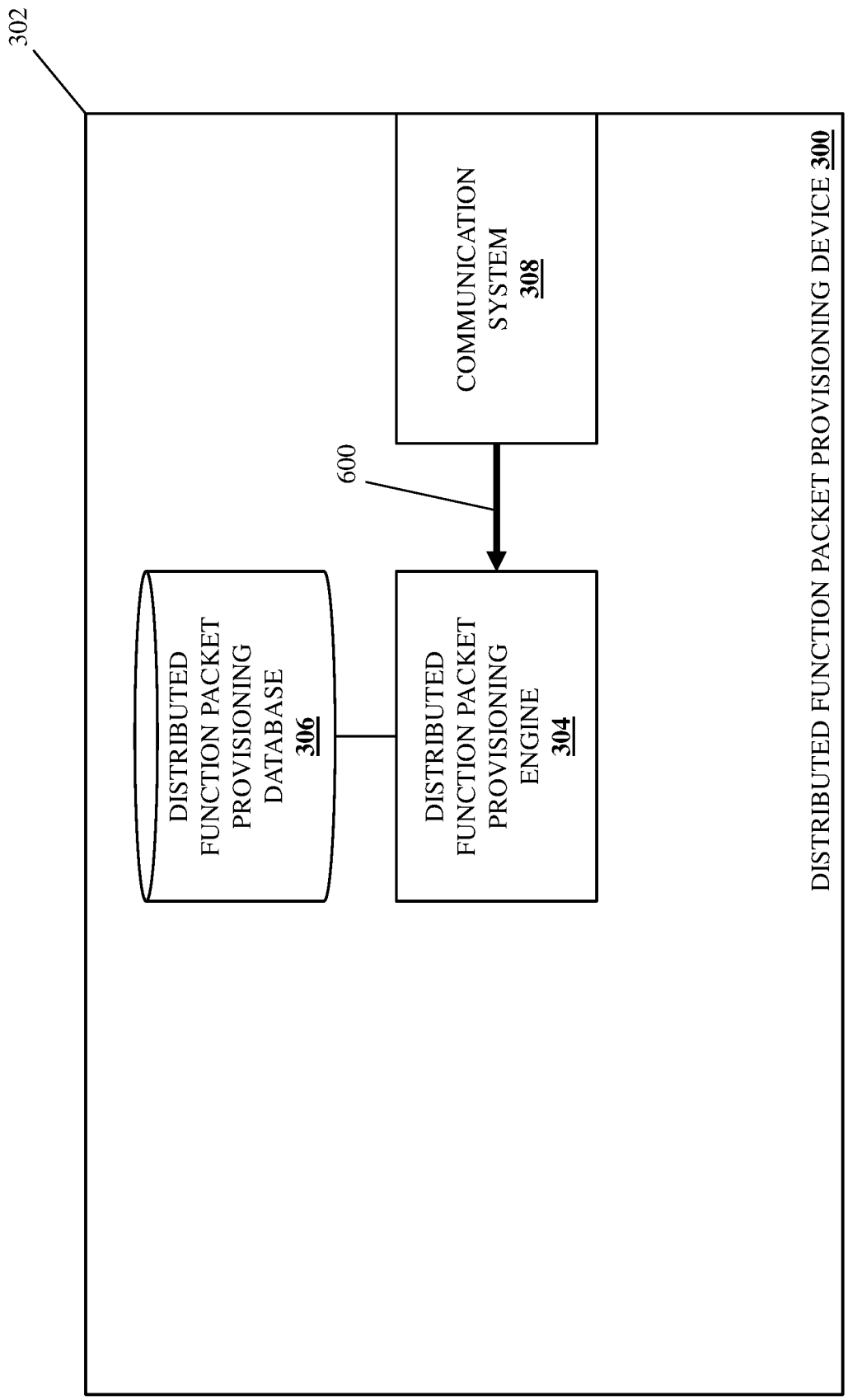
FIG. 6B is a schematic view illustrating an embodiment of the distributed function packet provisioning device of FIG. 3 operating during the method of FIGS. 5A and 5B.
Figure 7:
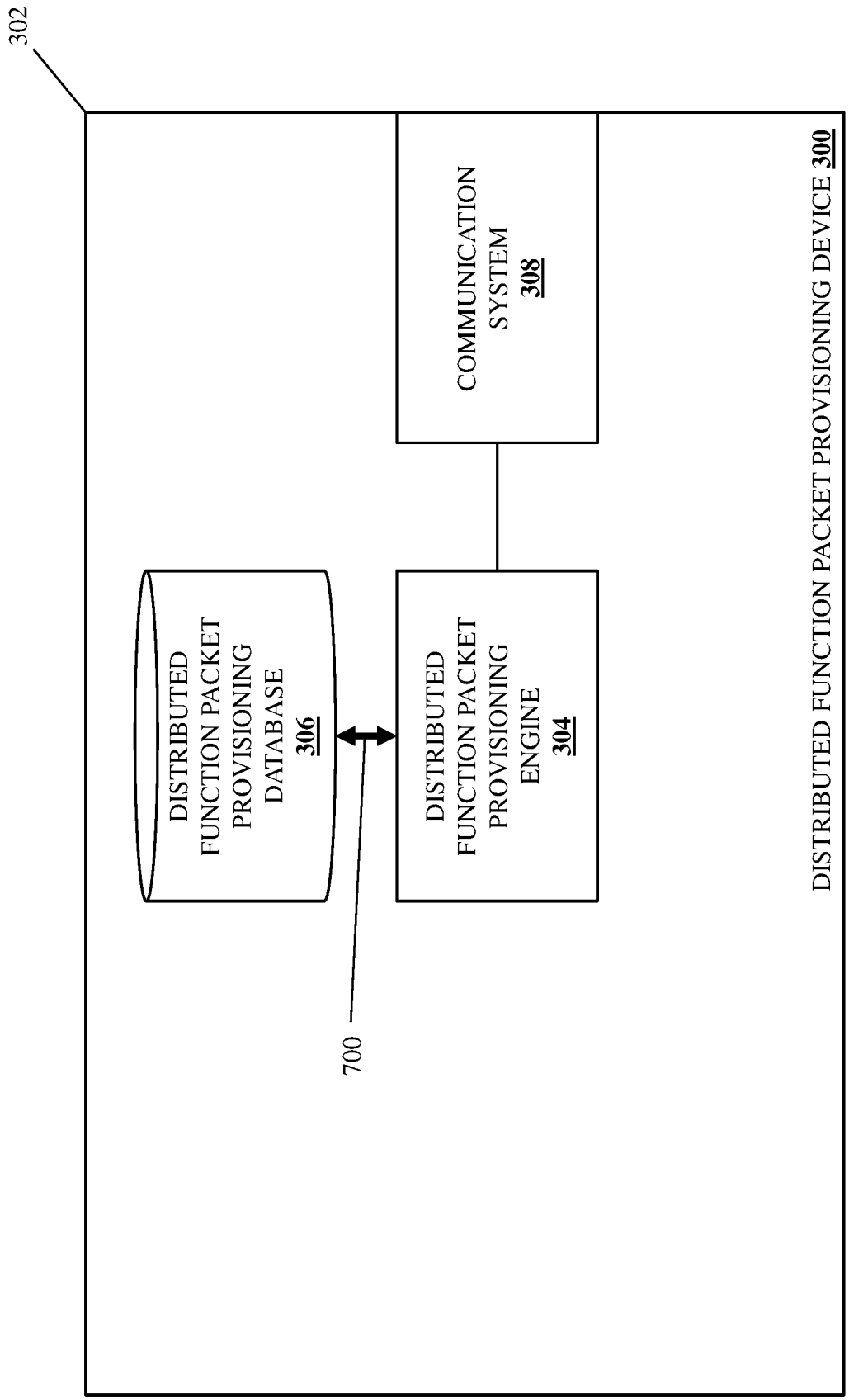
FIG. 7 is a schematic view illustrating an embodiment of the distributed function packet provisioning device of FIG. 3 operating during the method of FIGS. 5A and 5B.

The method 500a begins at block 502 where a distributed function packet provisioning device receives a request to perform a data transformation. With reference to FIGS. 6A and 6B, in an embodiment of block 502, any of the data provisioning device(s) 204 may perform data transformation request transmission operations 600 that may include transmitting a data transformation request to perform a data transformation, with the distributed function packet provisioning engine 304 in the distributed function packet provisioning device 202/300 receiving that data transformation request via its communication system 308. As discussed below, the data transformation request received at block 502 may include the data whose transformation is being requested via the data transformation request, may include a pointer to the location of the data whose transformation is being requested via the data transformation request, and/or may request the transformation of data stored in any of a variety of locations using any of a variety of techniques that would be apparent to one of skill in the art in possession of the present disclosure.

As discussed below, the data transformation request received at block 502 may include a plurality of data transformation operations for performing the data transformation being requested, and thus the receiving the data transformation request may include receiving the plurality of data transformation operations. However, in other embodiments, the data transformation request received at block 502 may be used to "look up" or otherwise identify the data transformation operations required to perform the data transformation being requested while remaining within the scope of the present disclosure as well. As also discussed below, the data transformation request received at block 502 may include one or more arguments that may be used in performing any of the data transformation operations for performing the data transformation being requested, and thus the receiving the data transformation request may include receiving the argument(s). However, in other embodiments, the data transformation request received at block 502 may be used to "look up" or otherwise identify the argument(s) that may be used in performing any of the data transformation operations required to perform the data transformation being requested while remaining within the scope of the present disclosure as well.

Furthermore, while illustrated and described as being provided by a data provisioning device 204 that is directly connected to the distributed function packet provisioning device 202 and/or coupled to the distributed function packet provisioning device 202 via a network, one of skill in the art in possession of the present disclosure will recognize how the data transformation request may be generated in the distributed function packet provisioning device 202 while remaining within the scope of the present disclosure as well. However, while specific examples of data transformation requests have been described, one of skill in the art in possession of the present disclosure will appreciate how data transformation requests may be provided in a variety of manners that will fall within the scope of the present disclosure as well.

The method 500a then proceeds to block 504 where the distributed function packet provisioning device determines a respective function for performing each data transformation operation in the data transformation. With reference to FIG.

7, in an embodiment of block 504, the distributed function packet provisioning engine 304 in the distributed function packet provisioning device 202/300 may perform function determination operations 700 that include accessing the distributed function packet provisioning database 306 to determine a respective function for performing each of the data transformation operations required to perform the data transformation requested at block 504. As such, in some embodiments, the distributed function packet provisioning engine 304 may identify the data transformation operations that were included in the data transformation request and determine the functions in the distributed function packet provisioning database 306 that perform those data transformation operations, while in other embodiments, the distributed function packet provisioning engine 304 may "look up" or otherwise identify the data transformation operations required to perform the data transformation included in the data transformation request and determine the functions in the distributed function packet provisioning database 306 that perform those data transformation operations.

In some embodiments, the functions stored in the distributed function packet provisioning database 306 may identify each of the functions that may be performed by the compute systems 208a-208c, 210a-210c, and 212a-212c in the compute system fabric 206. For example, during or prior to the method 500, the distributed function packet provisioning engine 304 in the distributed function packet provisioning device 202/300 may communicate with the compute systems 208a-208c, 210a-210c, and 212a-212c (e.g., using discovery protocols such as the Link Layer Discovery Protocol (LLDP)) to identify the functions those compute systems 208a-208c, 210a-210c, and 212a-212c are configured to perform, and may then store function identifiers for those functions in the distributed function packet provisioning database 306. In another example, during or prior to the method 500a, a user or network administrator may store function identifiers for the functions that the compute systems 208a-208c, 210a-210c, and 212a-212c are configured to perform in the distributed function packet provisioning database 306. However, while a few specific examples have been provided for identifying functions that may be performed by the compute system fabric 206, one of skill in the art in possession of the present disclosure will appreciate how functions available for performance by the compute system fabric 206 may be identified in a variety of manners that will fall within the scope of the present disclosure as well.

As discussed below, in some embodiments, each of the functions stored in the distributed function packet provisioning database 306 may be associated with a corresponding compute system identifier for the compute system(s) 208a-208c, 210a-210c, and 212a-212c that are configured to perform those function(s). As such, during or prior to the method 500, the distributed function packet provisioning engine 304 in the distributed function packet provisioning device 202/300 may associate the function identifier for each function that may be performed by the compute system(s) 208a-208c, 210a-210c, and 212a-212c with a compute system identifier for that compute system. In another example, during or prior to the method 500a, a user or network administrator may associate the function identifier for each function that may be performed by the compute system(s) 208a-208c, 210a-210c, and 212a-212c with a compute system identifier for that compute system. However, while a few specific examples have been provided for associating compute systems and the functions they perform, one of skill in the art in possession of the present disclosure will appreciate how functions may be associated with compute systems in a variety of manners that will fall within the scope of the present disclosure as well.

The method 500a then proceeds to block 506 where the distributed function packet provisioning device generates a distributed function packet that includes a function list, a data identifier, and a function performance identifier. In an embodiment, at block 506, the distributed function packet provisioning engine 304 in the distributed function packet provisioning device 202/300 may generate a distributed function packet that, as described in further detail below, includes a function list that identifies the respective functions determined at block 504, a data identifier identifying the data upon which those respective functions should be performed, and a function performance identifier that is configured to identify one of the respective functions that should be performed on the data, as well as a variety of other information that one of skill in the art in possession of the present disclosure will recognize as enabling the functionality described below.

Figure 8:
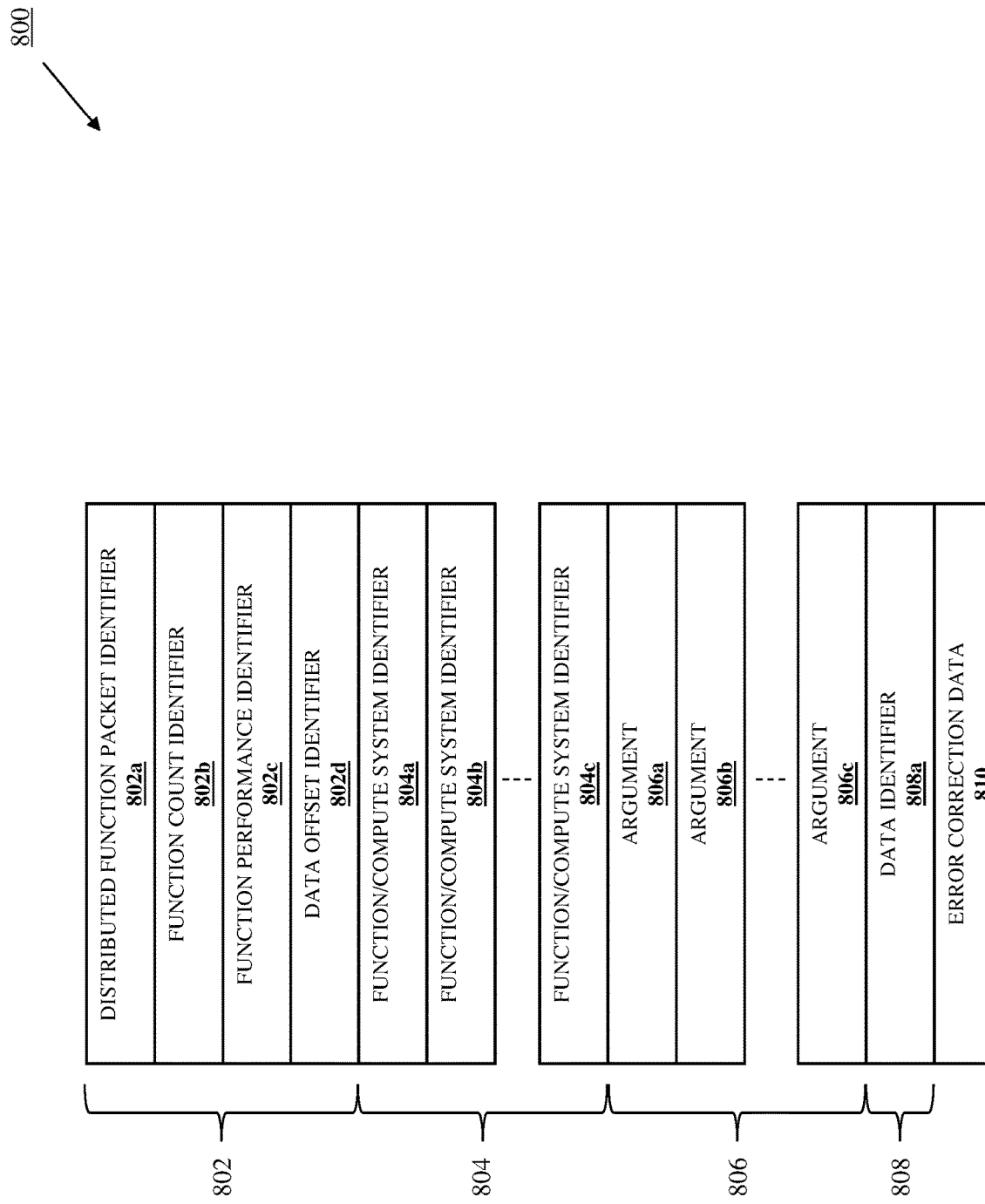
FIG. 8 is a schematic view illustrating an embodiment of a distributed function packet that may be utilized during the method of FIGS. 5A and 5B.
Figure 9:
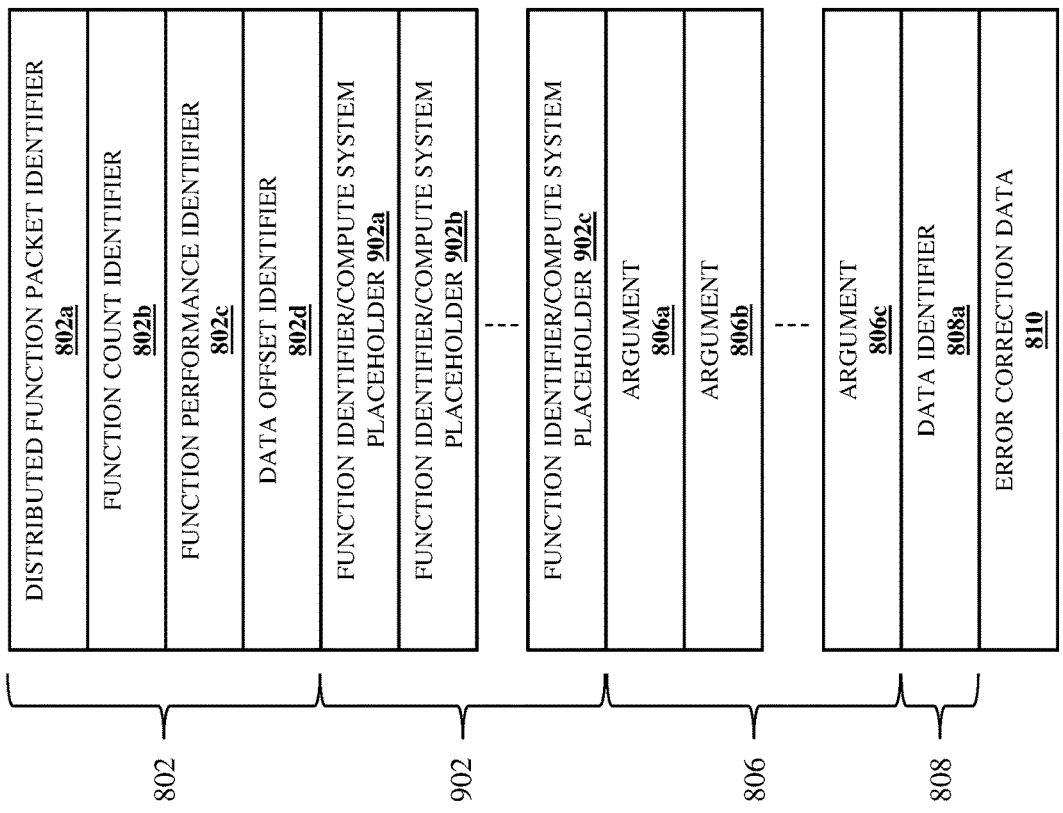
FIG. 9 is a schematic view illustrating an embodiment of a distributed function packet that may be utilized during the method of FIGS. 5A and 5B.

With reference to FIG. 8, an embodiment of a distributed function packet 800 is illustrated that may be generated at block 506. As described below, the distributed function packet 800 provides an example of a distributed function packet that defines each compute system that will perform each of the respective functions determined at block 506. As can be seen in FIG. 9, the distributed function packet 800 includes a metadata section 802 having a distributed function packet identifier 802a that may be provided by a Universally Unique IDentifier (UUID) or other information that is configured to uniquely identify the distributed function packet, a function count identifier 802b that is configured to identify a number of functions in the distributed function packet 800 for performing corresponding data transformation operations in a data transformation to transform data, a function performance identifier 802c that is configured to identify one of the plurality of function in the distributed function packet 800 that should be performed, and a data offset identifier 802d that is configured to identify an offset in the distributed function packet 800 at which the data upon which functions should be performed is identified.

As such, one of skill in the art in possession of the present disclosure will appreciate how, at block 506, the distributed function packet provisioning engine 304 in the distributed function packet provisioning device 202/300 may generate the distributed function packet identifier 802a and provide it in the metadata section 802 of the distributed function packet 800, may identify the number of functions required to perform the data transformation operations in the data transformation and provide that in the function count identifier 802b in the metadata section 802 of the distributed function packet 800, may identify the first function required to perform the data transformation operations in the data transformation and provide that in the function performance identifier 802c in the metadata section 802 of the distributed function packet 800, and may identify the offset in the distributed function packet 800 at which the data upon which functions should be performed will be identified and provide that in the data offset identifier 802d in the metadata section 802 of the distributed function packet 800. However, while a specific example of metadata that allows for the utilization of the distributed function packet has been described, one of skill in the art in possession of the present disclosure will appreciate how other information may enable the utilization of the distributed function packet while remaining within the scope of the present disclosure as well.

The distributed function packet 800 also includes a function section 804 (e.g., a "FaaS stack") having a plurality of function/compute system identifiers 804a, 804b, and up to 804c. As discussed below, each of the function/compute system identifiers 804a, 804b, and up to 804c may identify a respective one of the functions determined at block 504, along with a corresponding compute system that is configured to perform that function. For example, each of the function/compute system identifiers 804a, 804b, and up to 804c may be provided by a tuple including a function identifier and a compute system identifier, and as discussed below the compute system identifiers each predefine the compute system that will perform the function that is identified by the function identifier in its function/compute system identifier. As will be appreciated by one of skill in the art in possession of the present disclosure, the function section 804 provides a function list that identifies each respective function for performing each of the plurality of data transformation operations to provide the data transformation requested at block 502.

As such, one of skill in the art in possession of the present disclosure will appreciate how, at block 506, the distributed function packet provisioning engine 304 in the distributed function packet provisioning device 202/300 may determine, for each function determined at block 504, a respective compute system in a compute system fabric portion that is configured to perform that function optimally relative to the rest of the compute systems in that compute system fabric portion such that a plurality of compute systems are identified to perform functions in a sequence required to transform the data as requested at block 502. In an embodiment, the determination of the optimal compute systems to perform functions to transform data may utilize Artificial Intelligence/Machine Learning techniques based a history of those compute systems performing functions on data, a history of performance of the data transformation, and/or using other information that would be apparent to one of skill in the art in possession of the present disclosure.

As such, one of skill in the art in possession of the present disclosure will appreciate how performance of the functions on data by compute systems and the performance of the data transformation by different sequences of compute systems may allow for the identification of which of those compute systems may provide for the fastest, least processing intensive, and/or otherwise most optimal functions on data to transform it as requested at block 502. However, while a specific example of the determination of optimal compute systems for performing functions has been described as being performed by the distributed function packet provisioning engine 304, one of skill in the art in possession of the present disclosure will appreciate how the determination of optimal compute systems for performing functions may be performed by other systems (and identified by the distributed function packet provisioning engine 304 using those systems) while remaining within the scope of the present disclosure as well.

The distributed function packet provisioning engine 304 in the distributed function packet provisioning device 202/300 may then provide function identifiers for each of the functions determined at block 504, along with compute system identifier for each compute system that was determined for performing those functions, in the respective function/compute system identifiers 804a, 804b, and up to 804c. However, while a specific example of the identification of functions and compute systems has been described, one of skill in the art in possession of the present disclosure will appreciate how functions and compute systems may be identified using other techniques that will fall within the scope of the present disclosure as well.

The distributed function packet 800 also includes an arguments section 804 (e.g., an "argument stack") having a plurality of arguments 806a, 806b, and up to 806c. As discussed below, the arguments 806a, 806b, and up to 806c may be provided for use with one or more of the functions identified in the function/compute system identifiers 804a, 804b, and up to 804c (although one of skill in the art in possession of the present disclosure will appreciate how functions may be performed with arguments while remaining within the scope of the present disclosure as well), and thus the distributed function packet 800 may include pointers or other identifiers for identifying which arguments should be used with which functions. In one example, any function in the function/compute system identifiers 804a, 804b, and up to 804c may identify one or more of the arguments 806a, 806b, and up to 806c for use in performing that function. In another example, the arguments 806a, 806b, and up to 806c may identify one of the functions in the function/compute system identifiers 804a, 804b, and up to 804c with which they should be used. As such, one of skill in the art in possession of the present disclosure will appreciate how, at block 506, the distributed function packet provisioning engine 304 in the distributed function packet provisioning device 202/300 may retrieve the arguments 806a, 806b, and up to 806c (e.g., from the request to perform the data transformation or some other argument source), and provide those in the distributed function packet 800. However, while a specific example of the provision of arguments for use in performing functions has been described, one of skill in the art in possession of the present disclosure will appreciate how arguments for performing functions may be provided using other techniques that will fall within the scope of the present disclosure as well.

The distributed function packet 800 also includes a payload section 808 that may include a data identifier 808a identifying data upon which the functions identified in the function/compute system identifiers 804a, 804b, and up to 804c should be performed. In some embodiments, the data identifier 808a in the payload section 808 may store the data upon which the functions identified in the function/compute system identifiers 804a, 804b, and up to 804c should be performed (i.e., that data "identifier" 808a may identify the data upon which the functions should be performed by including that data). For example, in some situations the distributed function packet 800 may include sufficient space for storing the data upon which the functions identified in the function/compute system identifiers 804a, 804b, and up to 804c should be performed, and in those situations that data may be stored in the payload section 808 of the distributed function packet 800. As such, one of skill in the art in possession of the present disclosure will appreciate how, at block 506, the distributed function packet provisioning engine 304 in the distributed function packet provisioning device 202/300 may retrieve the data (e.g., from the request to perform the data transformation or some other data source), and provide that data in the data identifier 808a of the payload section 808 in the distributed function packet 800. In a specific example the data may be provided (or converted to) a common format processable by the compute systems in the compute system fabric 206 (e.g., an Arrow data format according to the APACHE® Arrow Flight framework) before its provisioning in the distributed function packet 800.

In other embodiments, the data identifier 808a in the payload section 808 may store pointers and/or other location information about the data upon which the functions identified in the function/compute system identifiers 804*a*, 804*b*, and up to 804*c* should be performed (i.e., that data "identifier" 808*a* may identify the data upon which the functions should be performed by identifying the location of that data outside the distributed function packet 800). For example, in some situations the distributed function packet 800 may not include sufficient space for storing the data upon which the functions identified in the function/compute system identifiers 804*a*, 804*b*, and up to 804*c* should be performed, and in those situations that data may be stored outside the distributed function packet 800 (e.g., in the distributed function packet provision system 202, in a network-accessible storage location, etc.) and its location may be identified in the payload section 808 of the distributed function packet 800. As such, one of skill in the art in possession of the present disclosure will appreciate how, at block 506, the distributed function packet provisioning engine 304 in the distributed function packet provisioning device 202/300 may identify the location of the data (e.g., from the request to perform the data transformation or some other data location identification source), and identify that location in the data identifier 808*a* of the payload section 808 in the distributed function packet 800. Similarly as discussed above, the data may be provided (or converted to) a common format processable by the compute systems in the compute system fabric 206 (e.g., an Arrow data format according to the APACHE® Arrow Flight framework) before it is stored.

However, a few specific examples of the identification of data upon which functions should be performed have been provided, one of skill in the art in possession of the present disclosure will appreciate how other techniques for identifying such data will fall within the scope of the present disclosure as well. For example, while the data is described as either being included in a single distributed function packet, or being stored in a location that is identified in the distributed function packet, in other embodiments data may be included in multiple distributed function packets that may include a packet providing the distributed function packet information described herein, and packets storing or otherwise including the data upon which the functions are performed.

The distributed function packet 800 also includes error correction data 810 that may include Cyclic Redundancy Check (CRC) data and/or other error correction data that one of skill in the art in possession of the present disclosure would recognize as providing for the correction of errors in the data identified in the payload section 808 of the distributed function packet 800 and/or the information provided in the metadata section 802, the function section 804, the argument section, and/or elsewhere in the distributed function packet 800. As such, one of skill in the art in possession of the present disclosure will appreciate how, at block 506, the distributed function packet provisioning engine 304 in the distributed function packet provisioning device 202/300 may generate or retrieve the error correction data 810 and provide it in the distributed function packet 800. However, while specific embodiments of a distributed function packet 800 have been described, one of skill in the art in possession of the present disclosure will appreciate how distributed function packets may be provided according to the teachings of the present disclosure in a variety of other manners that will fall within the scope of the present disclosure as well.

For example, with reference to FIG. 9, an embodiment of a distributed function packet 900 is illustrated that may be generated at block 506 and that is similar to the distributed function packet 800, with similar elements provided with the same element numbers. As described below, the distributed function packet 900 provides an example of a distributed function packet that does not initially define each compute system that will perform each of the respective functions determined at block 506. As such, the function section 804 discussed above with reference to FIG. 8 may be replaced with a function section 902 (e.g., a "FaaS stack") having a plurality of function identifier/compute system placeholders 902*a*, 902*b*, and up to 902*c*. As discussed below, each of the function identifier/compute system placeholders 902*a*, 902*b*, and up to 902*c* may identify a respective one of the functions determined at block 504 without identifying a corresponding compute system that is configured to perform that function.

For example, each of the function identifier/compute system placeholders 902*a*, 902*b*, and up to 902*c* may be provided by a tuple including a function identifier, along with a compute system placeholder that has been left "blank" or otherwise not filled with a compute system identifier for any of the compute systems in the compute system fabric 206, and as discussed below the "blank" compute system placeholder may cause each compute system performing a function identified by the function identifier in its function/compute system identifier to identify a subsequent function that should be performed, and then determine a compute system for performing that function. As will be appreciated by one of skill in the art in possession of the present disclosure, the function section 902 provides a function list that identifies each respective function for performing each of the plurality of data transformation operations to provide the data transformation requested at block 502.

As such, one of skill in the art in possession of the present disclosure will appreciate how, at block 506, the distributed function packet provisioning engine 304 in the distributed function packet provisioning device 202/300 may provide function identifiers for each of the functions determined at block 504, without identifying compute system identifier for each compute system that performs those functions, in the respective function identifier/compute system placeholders 902*a*, 902*b*, and up to 902*c*. However, while a specific example of the identification of functions without identifying the compute systems that will perform those functions has been described, one of skill in the art in possession of the present disclosure will appreciate how functions may be identified while allowing the compute systems that will perform those functions to be identified later using other techniques that will fall within the scope of the present disclosure as well.

Figure 10A:
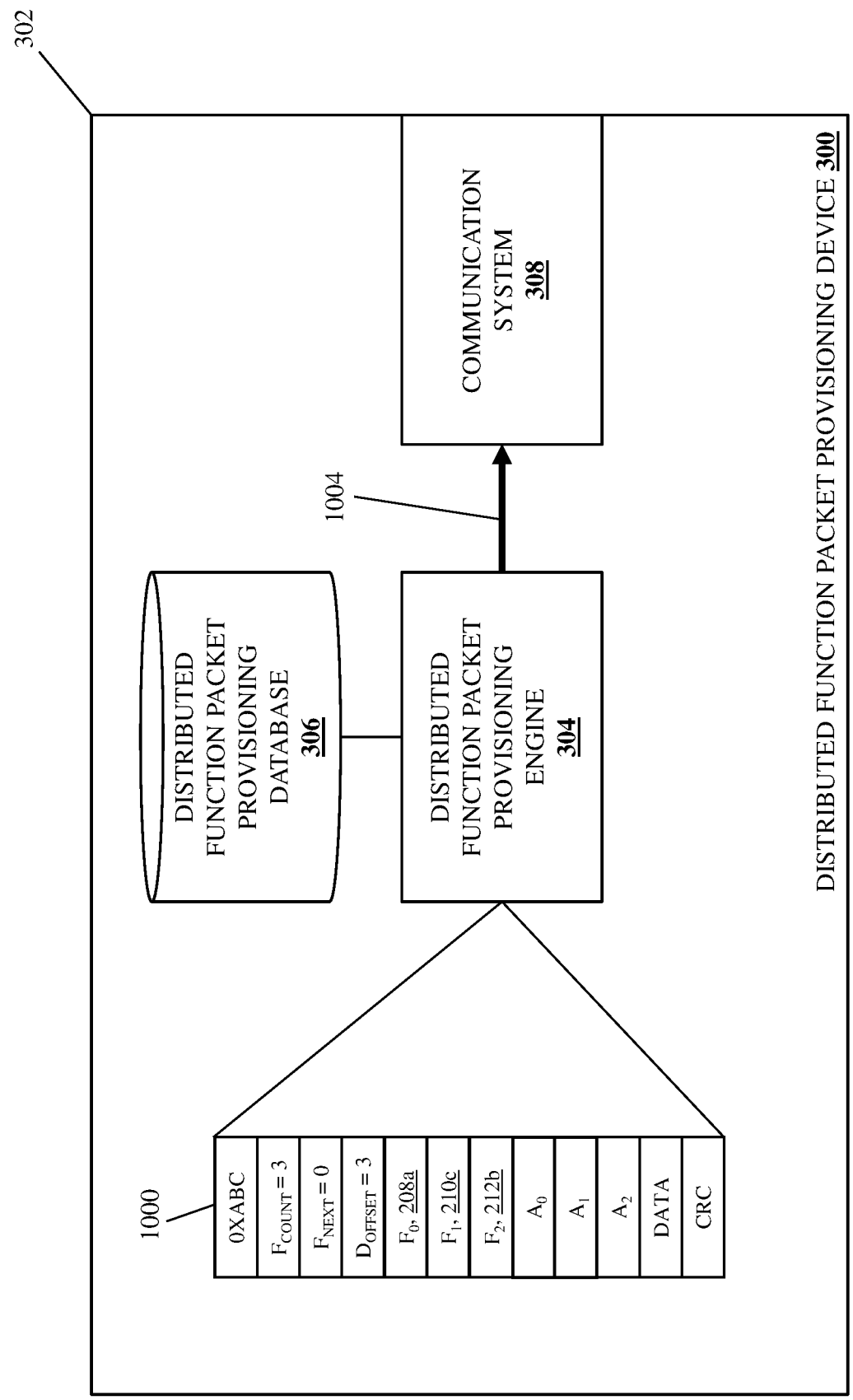
FIG. 10A is a schematic view illustrating an embodiment of the distributed function packet provisioning device of FIG. 3 operating during the method of FIGS. 5A and 5B.

The method 500*a* then proceeds to block 508 where the distributed function packet provisioning device transmits the distributed function packet to a compute system fabric. With reference to FIG. 10A, a specific example of a distributed function packet 1000 is illustrated that one of skill in the art in possession of the present disclosure will recognize defines each compute system that will perform each of the respective functions identified in the distributed function packet similarly as described above for the distributed function packet 800 discussed above with reference to FIG. 8. As can be seen in FIG. 10A, the metadata section of the distributed function packet 1000 includes a distributed function packet identifier (e.g., the UUID "0XABC" in FIG. 10A), a function count identifier (e.g., "$F_{COUNT}=3$" in FIG. 10A) that indicates that three functions will be performed using the distributed function packet 1000, a function performance identifier (e.g., "$F_{NEXT}=0$" in FIG. 10A) that indicates that a function "0" should be performed next, and a data offset identifier (e.g., "$D_{OFFSET}=3$" in FIG. 10A) that indicates where in the packet to access the data upon which functions should be performed.

Furthermore, the function section of the distributed function packet 1000 includes a first function identifier/compute system identifier ("$F_0$, 208a") that indicates a first function that will be performed by the compute system 208a, a second function identifier/compute system identifier ("$F_1$, 210c") that indicates a second function that will be performed by the compute system 210c, and a third function identifier/compute system identifier ("$F_2$, 212b") that indicates a third function that will be performed by the compute system 212b. As such, the distributed function packet 1000 provides a simplified example in which only three functions are performed in sequence according to the distributed function packet 1000, and one of skill in the art in possession of the present disclosure will appreciate how many more functions may be performed using the distributed function packets of the present disclosure while remaining within the scope of the present disclosure as well. Furthermore, while the examples below illustrate sequentially performed functions, in some embodiments the function section of the distributed function packet 1000 may provide "if-then-else" logic that may be used by the compute systems in the compute system fabric 206 to identify which of the functions identified in the distributed function packet 1000 should subsequently be performed.

Further still, the argument section of the distributed function packet 1000 includes a first argument ("$A_0$") and a second argument ("$A_1$") that, in the specific example below, are used by the compute system 210c to perform the second function, as well as a third argument ("$A_2$") that is used by the compute system 208a to perform the first function. The payload section of the distributed function packet 1000 includes data "DATA" that, as discussed above, may include the data upon which the functions identified in the distributed function packet 1000 may be performed, or pointers to that data. The distributed function packet 1000 also includes error correction data ("CRC").

Figure 10B:
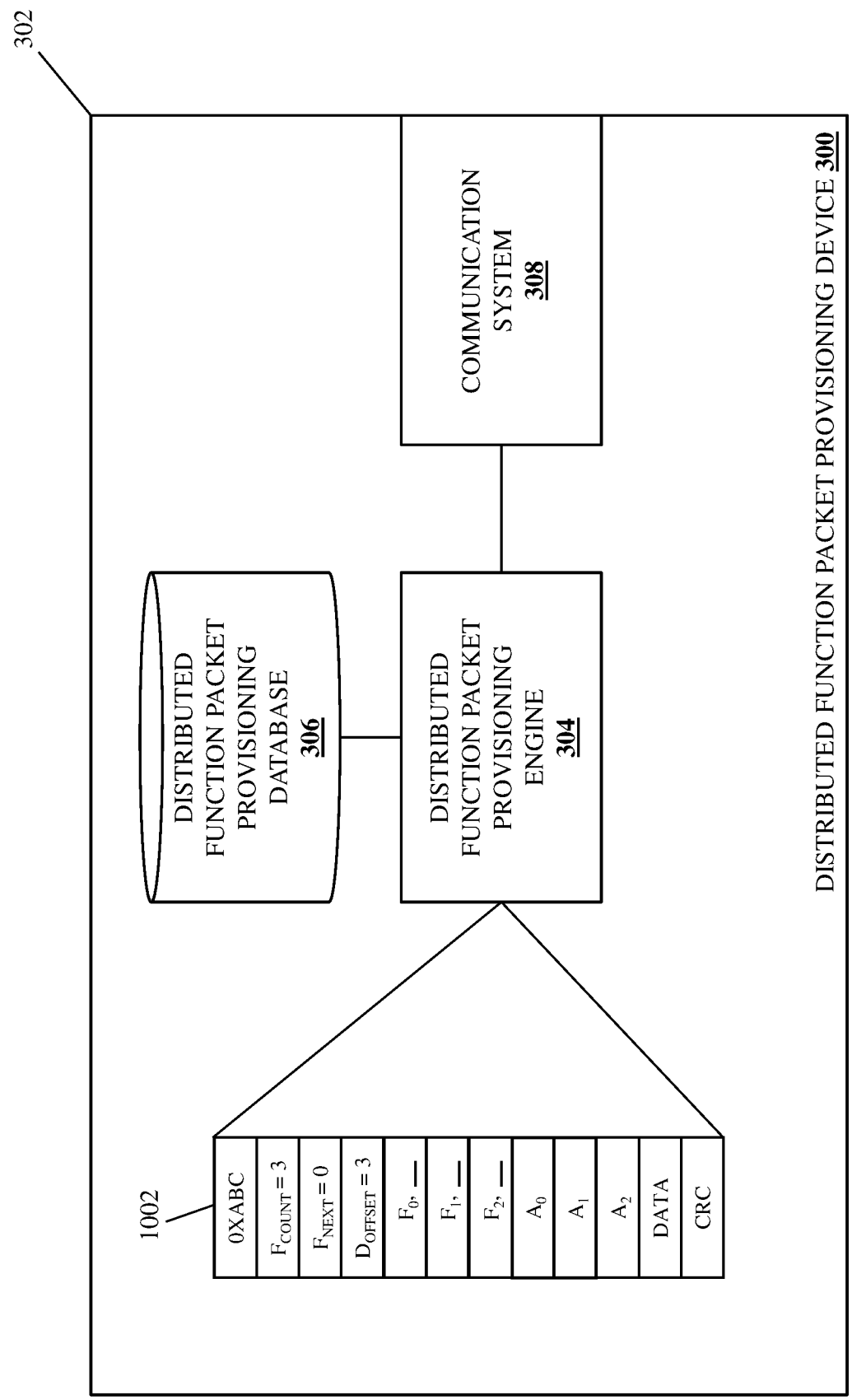
FIG. 10B is a schematic view illustrating an embodiment of the distributed function packet provisioning device of FIG. 3 operating during the method of FIGS. 5A and 5B.
Figure 10C:
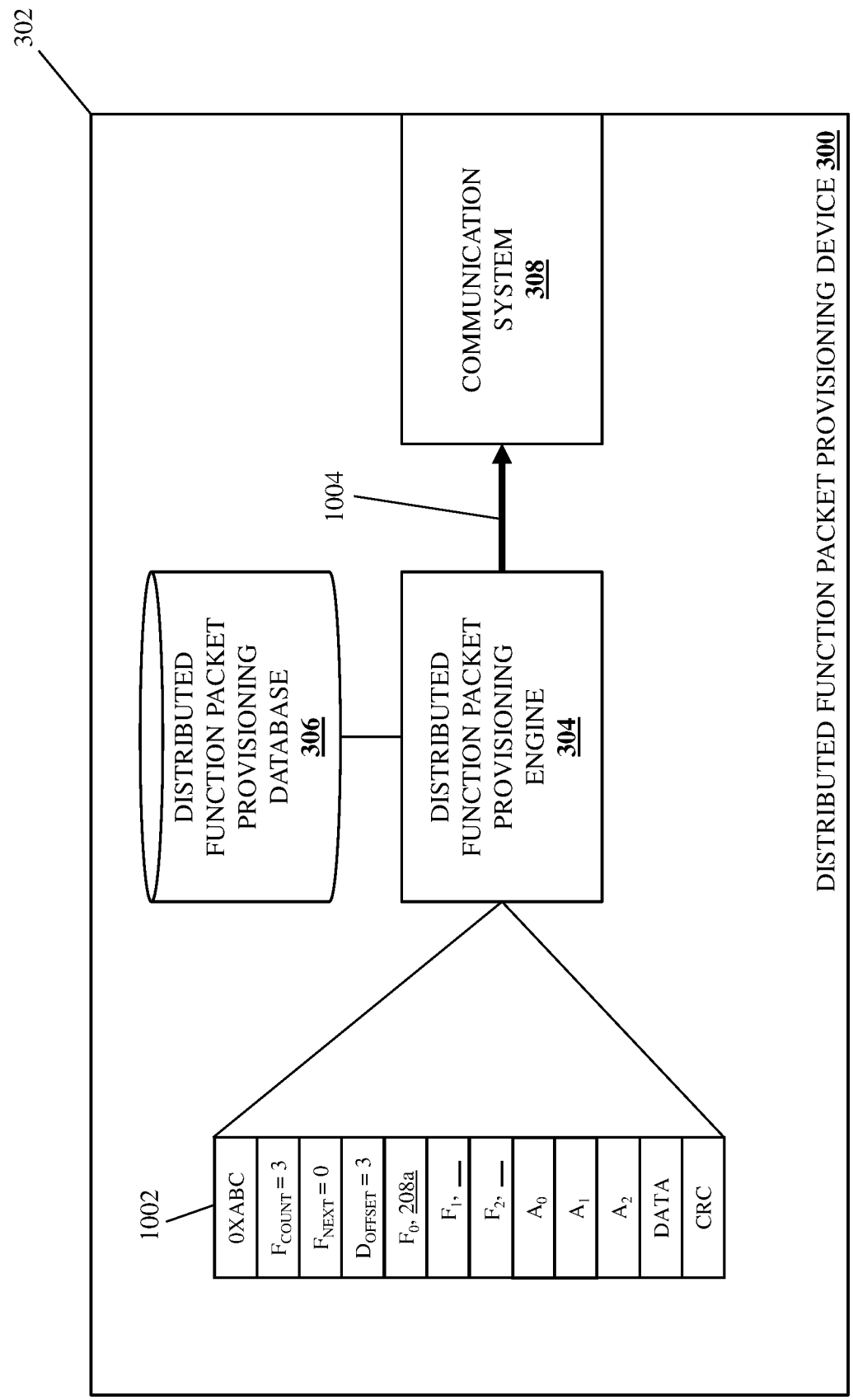
FIG. 10C is a schematic view illustrating an embodiment of the distributed function packet provisioning device of FIG. 3 operating during the method of FIGS. 5A and 5B.
Figure 10D:
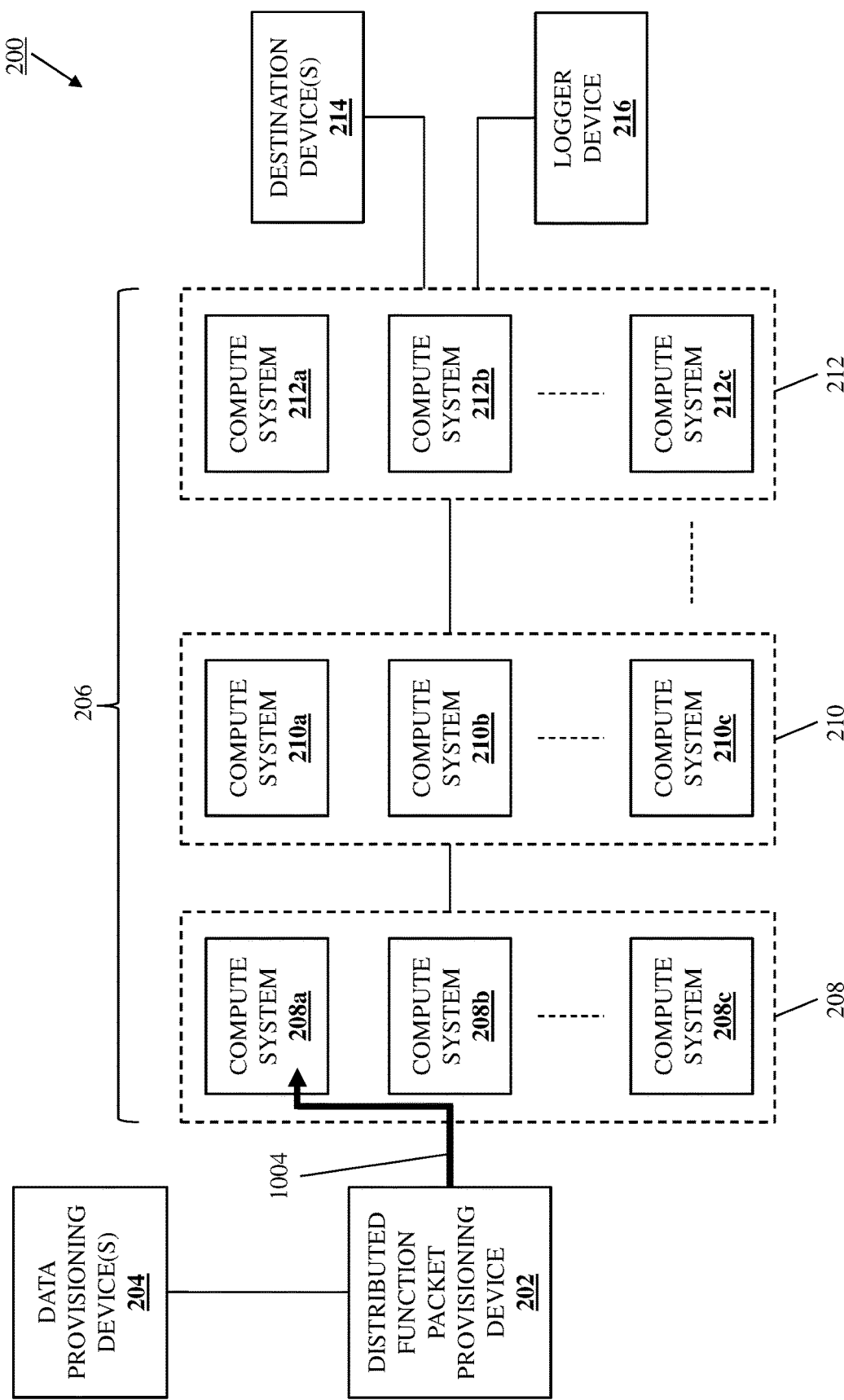
FIG. 10D is a schematic view illustrating an embodiment of the distributed function data transformation system of FIG. 2 operating during the method of FIGS. 5A and 5B.
Figure 10E:
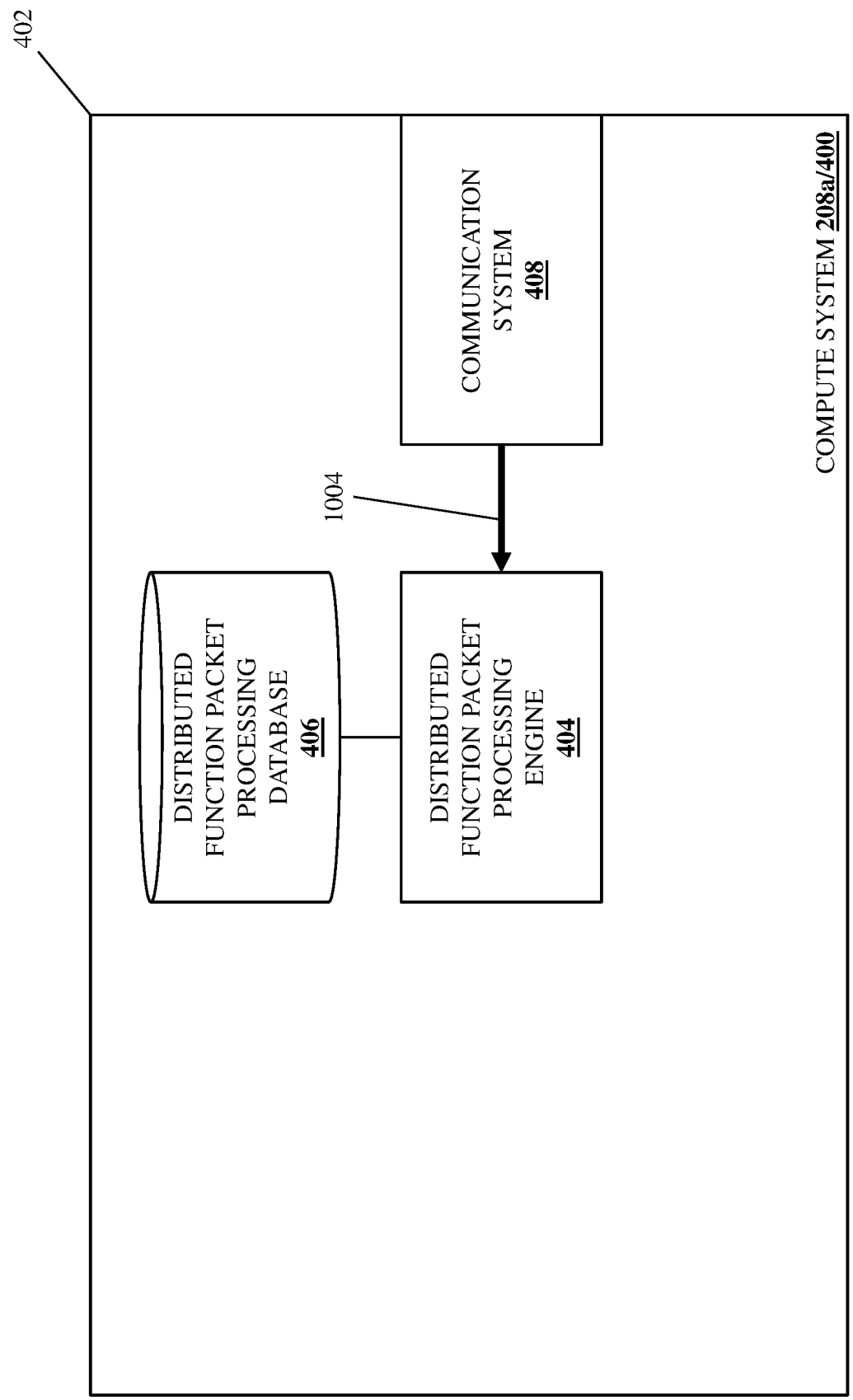
FIG. 10E is a schematic view illustrating an embodiment of the compute system of FIG. 4 operating during the method of FIGS. 5A and 5B.

As illustrated in FIGS. 10B and 10C, one of skill in the art in possession of the present disclosure will appreciate how the distributed function packet 1000 may be replaced with a distributed function packet 1002 that does not define each compute system that will perform each of the respective functions identified in the distributed function packet similarly as described above for the distributed function packet 900 discussed above with reference to FIG. 9. As will be appreciated by one of skill in the art in possession of the present disclosure, the function section of the distributed function packet 1002 may replace the function section of the distributed function packet 1000 illustrated in FIG. 10A with a first function identifier/compute system placeholder ("$F_0$, \_\_\_\_\_") that indicates a first function that will be performed without identifying the compute system that will perform it, a second function identifier/compute system placeholder ("$F_1$, \_\_\_\_\_") that indicates a second function that will be performed without identifying the compute system that will perform it, and a third function identifier/compute system placeholder ("$F_2$, \_\_\_\_\_") that indicates a third function that will be performed without identifying the compute system that will perform.

Furthermore, one of skill in the art in possession of the present disclosure will appreciate how, prior to transmitting the distributed function packet 1002, the distributed function packet provisioning engine 304 in the distributed function packet provisioning device 202/300 may determine the compute system that will perform the first function (e.g., the compute system 208a in the example below), and identify that compute system in the first function identifier/compute system placeholder ("$F_0$, 208a"), as illustrated in FIG. 10C. For example, similarly as described above (as well as below for the compute systems) and prior to transmitting the distributed function packet 1002, the distributed function packet provisioning engine 304 may identify the first function identified in the first function identifier/compute system placeholder ("$F_0$, \_\_\_\_\_"), and then may determine that the compute system 208a in the first compute system fabric portion 208 is configured to perform that first function optimally relative to the rest of the compute systems 208b-208c in the first compute system fabric portion 208 and, in response, provide a compute system identifier for the compute system 208a in the first function identifier/compute system placeholder ("$F_0$, 208a"). In a specific example, the determination that the compute system 208a in the first compute system fabric portion 208 is configured to perform that first function optimally relative to the rest of the compute systems 208b-208c in the first compute system fabric portion 208 may include querying or accessing a registry (e.g., in the distributed function packet provisioning system 202, coupled to a network, etc.) that identifies the compute systems 208a-208c in the first compute system fabric portion 208 and their corresponding functions.

With reference to FIGS. 10A, 10C, 10D, and 10E, in an embodiment of block 508, the distributed function packet provisioning engine 304 in the distributed function packet provisioning device 202/300 may perform distributed function packet transmission operations 1004 that may include transmitting the distributed function packet 1000 or 1002 via its communication system 308 and to the compute system fabric 206. Furthermore, continuing with the specific example described above and illustrated below, the distributed function packet transmission operations 1004 may include transmitting the distributed function packet 1000 or 1002 to the compute system 208a in the first compute system fabric portion 208 such that it is received by the distributed function packet processing engine 404 in the compute system 208a/400 via its communication system 408.

As will be appreciated by one of skill in the art in possession of the present disclosure, following block 508, the method 500b may begin such that "current" compute systems receive the distributed function packet 1000 or 1002, perform function(s) identified therein, and then forward the distributed packet to "subsequent" compute systems, with each "subsequent" compute system that receives the distributed compute system then becoming a "current" compute system in the method 500, and this process being repeated until all the functions identified in the distributed function packet 1000 or 1002 have been performed.

As such, the method 500b may begin block 510 where a current compute system uses a function performance identifier to identify a current function identified in a function list in the distributed function packet. In an embodiment, at block 510, the distributed function packet processing engine 404 in the compute system 208a/400 may use the function performance identifier (e.g., "$F_{NEXT}=0$") in the metadata portion of the distributed function packet 1000 or 1002 to identify the first function ("$F_0$") in the function section of the distributed function packet 1000 or 1002. However, while the use of "$F_{NEXT}$" as the function performance identifier has been described, one of skill in the art in possession of the present disclosure will appreciate how the compute system 208a may use the compute system identifier associated with the first function identifier in the function section of the distributed function packet 1000 or 1002 as the function performance identifier or to otherwise identify the function to perform (i.e., because that compute system identifier identifies that the compute system 208a should perform the first function). As such, while a particular function performance identifier "$F_{NEXT}$" is illustrated and described in the specific examples below, a variety of techniques for identifying to the compute systems which function should be performed (and thus a variety of function performance identifiers) will fall within the scope the present disclosure as well.

The method 500b then proceeds to block 512 where the current compute system performs the current function on data identified in a data identifier in the distributed function packet to generated transformed data. In an embodiment, at block 512, the distributed function packet processing engine 404 in the compute system 208a/400 may then perform the first function ("$F_0$") on the data ("DATA") identified in the distributed function packet 1000 or 1002. For example, the distributed function packet processing engine 404 may use the data offset identifier (e.g., "$D_{OFFSET}=3$") to identify the location of the data identifier (e.g., "DATA") in the distributed function packet 1000 or 1002, and then use that data identifier to retrieve the data and perform the first function ("$F_0$") on that data. As will be appreciated by one of skill in the art in possession of the present disclosure, the "use" of the data identifier to retrieve the data may include determining that the data is stored in the payload section of the distributed function packet 1000 or 1002 and thus retrieving that data, or the use of the data identifier to determine the location of the data outside the distributed function packet 1000 or 1002 (e.g., in the distributed function packet provisioning system 202, in a network-attached storage, etc.), and the retrieval of that data from that location (e.g., using fabric Remote Direct Memory Access (RDMA) techniques).

As discussed above, the first function ("$F_0$") performed on the data by the compute system 208a at block 512 may include any of a variety of data transformations that one of skill in the art in possession of the present disclosure will recognize as being configured to transform data. For example, the distributed function packet processing engine 404 in the compute system 208a/400 may retrieve the third argument ("$A_2$") from the argument section of the distributed function packet 1000 or 1002, and use that third argument ("$A_2$") in performing the first function ("$F_0$") on the data in order to generate first transformed data. In a specific example, the first function ("$F_0$") may provide for the capturing, cleaning, and processing of image data while adding noise and shifts to augment the image data set, and the third argument may include the details of the noise and shifts used to augment the image data set. However, while a specific example of a function and argument has been described, one of skill in the art in possession of the present disclosure will appreciate how functions may utilize a variety of argument(s) (or may not utilize any arguments) while remaining within the scope of the present disclosure as well. As discussed below, the first transformed data may then be stored in a storage location accessible to the compute system 208a, or may be provided in the distributed function packet 1000 or 1002 by the compute system 208a (e.g., in addition to original data, in place of the original data, etc.) for transmission.

The method 500b then proceeds to decision block 514 where it is determined whether the current function is the final function in the function list. In an embodiment, at decision block 514, the distributed function packet processing engine 404 in the compute system 208a/400 may determine whether the first function ("$F_0$") performed at block 512 is the final function in the function section of the distributed function packet 1000 or 1002. For example, the distributed function packet processing engine 404 may use the function count identifier ("$F_{COUNT}$"), the functions identified in the function section of the distributed function packet 1000 or 1002, and/or other techniques that would be apparent to one of skill in the art in possession of the present disclosure, in order to determine whether the first function ("$F_0$") is the final function in the function section of the distributed function packet 1000 or 1002.

Figure 11A:
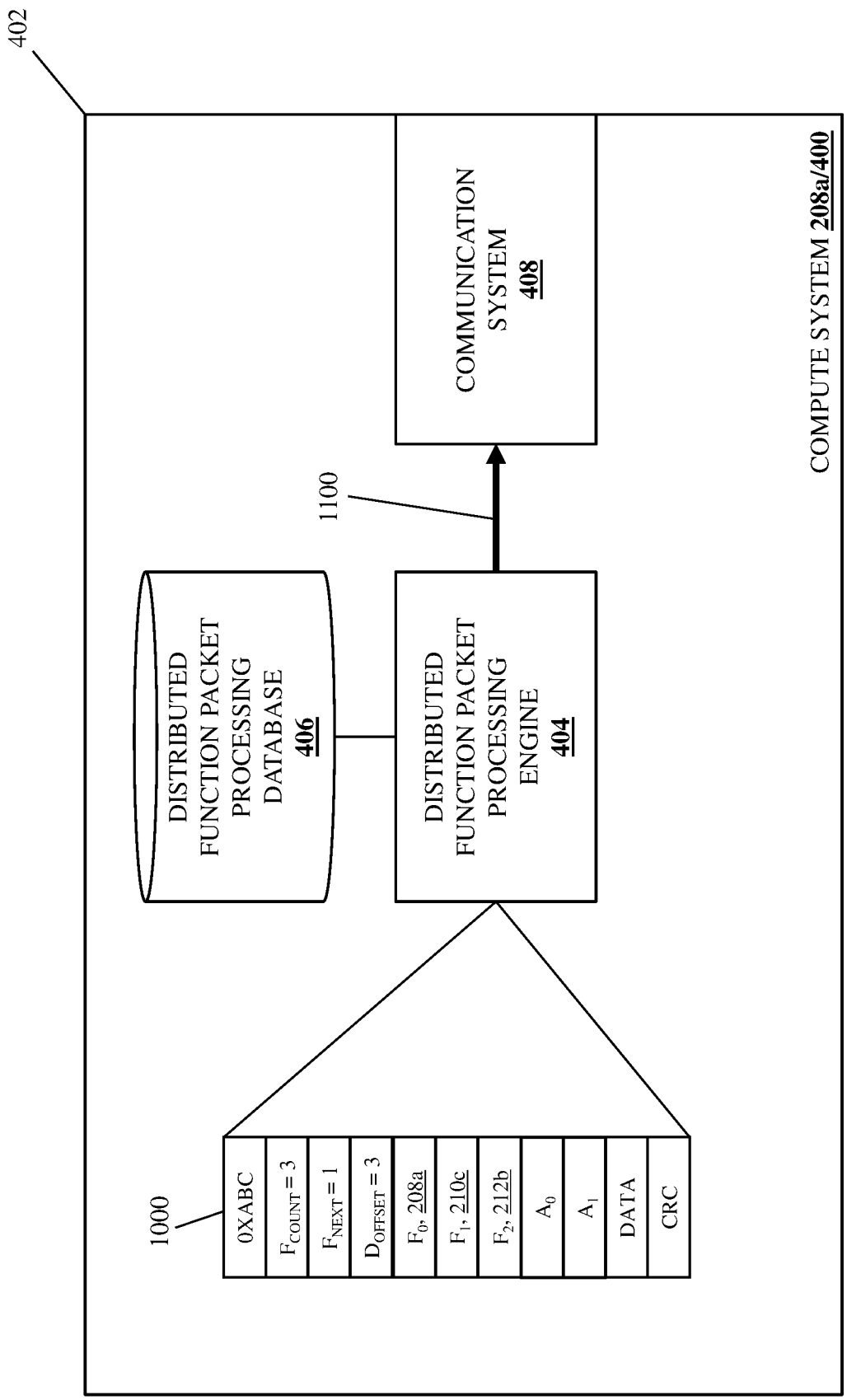
FIG. 11A is a schematic view illustrating an embodiment of the compute system of FIG. 4 operating during the method of FIGS. 5A and 5B.
Figure 11B:
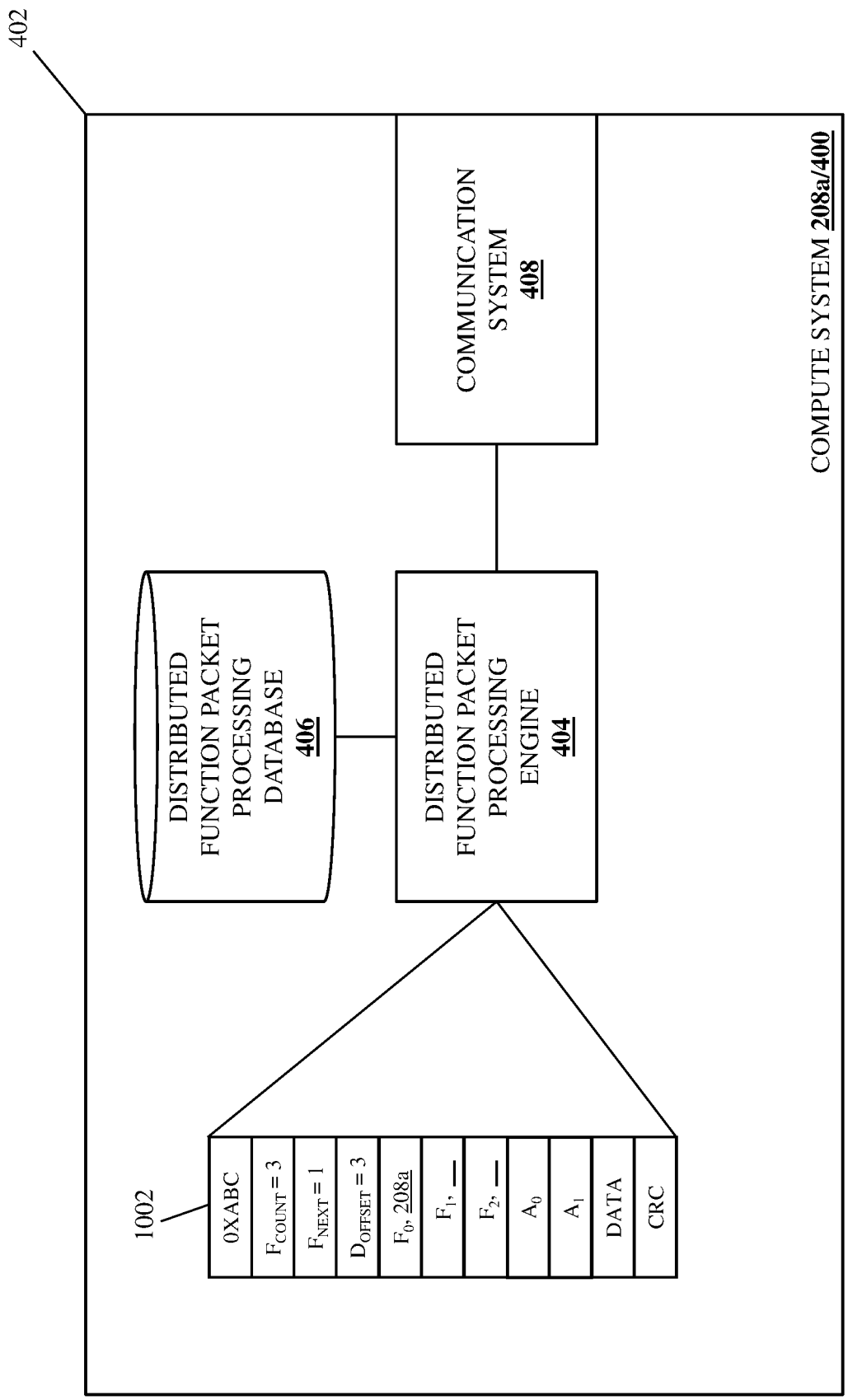
FIG. 11B is a schematic view illustrating an embodiment of the compute system of FIG. 4 operating during the method of FIGS. 5A and 5B.

If, at decision block 514, it is determined that the current function is not the final function in the function list, the method 500b proceeds to block 516 where the current compute system increments the function performance identifier. In an embodiment, at decision block 514, the distributed function packet processing engine 404 in the compute system 208a/400 may determine that the first function ("$F_0$") performed at block 512 is not the final function in the function section of the distributed function packet 1000 or 1002 based on the function count identifier ("$F_{COUNT}$") in the metadata section of the distributed function packet 1000 or 1002 indicating that there are addition functions to perform on the first transformed data, based on the functions identified in the function section of the distributed function packet 1000 or 1002 indicating that there are addition functions to perform on the first transformed data, and/or using other techniques that would be apparent to one of skill in the art in possession of the present disclosure. As illustrated in FIGS. 11A and 11B, in response to determining that the first function ("$F_0$") performed at block 512 is not the final function in the function section of the distributed function packet 1000 or 1002, at block 516 the distributed function packet processing engine 404 in the compute system 208a/400 may then increment the function performance identifier ("$F_{NEXT}$") in the metadata section of the distributed function packet 1000 or 1002 (e.g., from "$F_{NEXT}=0$" to "$F_{NEXT}=1$").

The method 500b then proceeds to block 518 where the current compute system uses the function performance identifier to identify a subsequent function identified in the function list in the distributed function packet. With reference to FIG. 11A, in an embodiment of block 518, the distributed function packet processing engine 404 in the compute system 208a/400 may use the function performance identifier (e.g., "$F_{NEXT}=1$") in the metadata section of the distributed function packet 1000 to identify a second function ("$F_1$") in the second function identifier/compute system identifier ("$F_1$, 210c") included in the function section of the distributed function packet 1000. With reference to FIG. 11B, in another embodiment of block 518, the distributed function packet processing engine 404 in the compute system 208a/400 may use the function performance identifier (e.g., "$F_{NEXT}=1$") in the metadata section of the distributed function packet 1002 to identify a second function ("$F_1$") in the second function identifier/compute system placeholder ("$F_1$, _____") included in the function section of the distributed function packet 1002. The method 500b then proceeds to block 520 where the current compute system identifies a subsequent compute system for performing the subsequent function. With reference to FIG. 11A, in an embodiment of block 520, the distributed function packet processing engine 404 in the compute system 208a/400 may identify the compute system 210c for performing the second function ("$F_1$") based on the compute system identifier for that compute system 210c being associated with the second function ("$F_1$") in the second function identifier/compute system identifier ("F$_1$, 210c") included in the function section of the distributed function packet 1000.

Figure 11C:
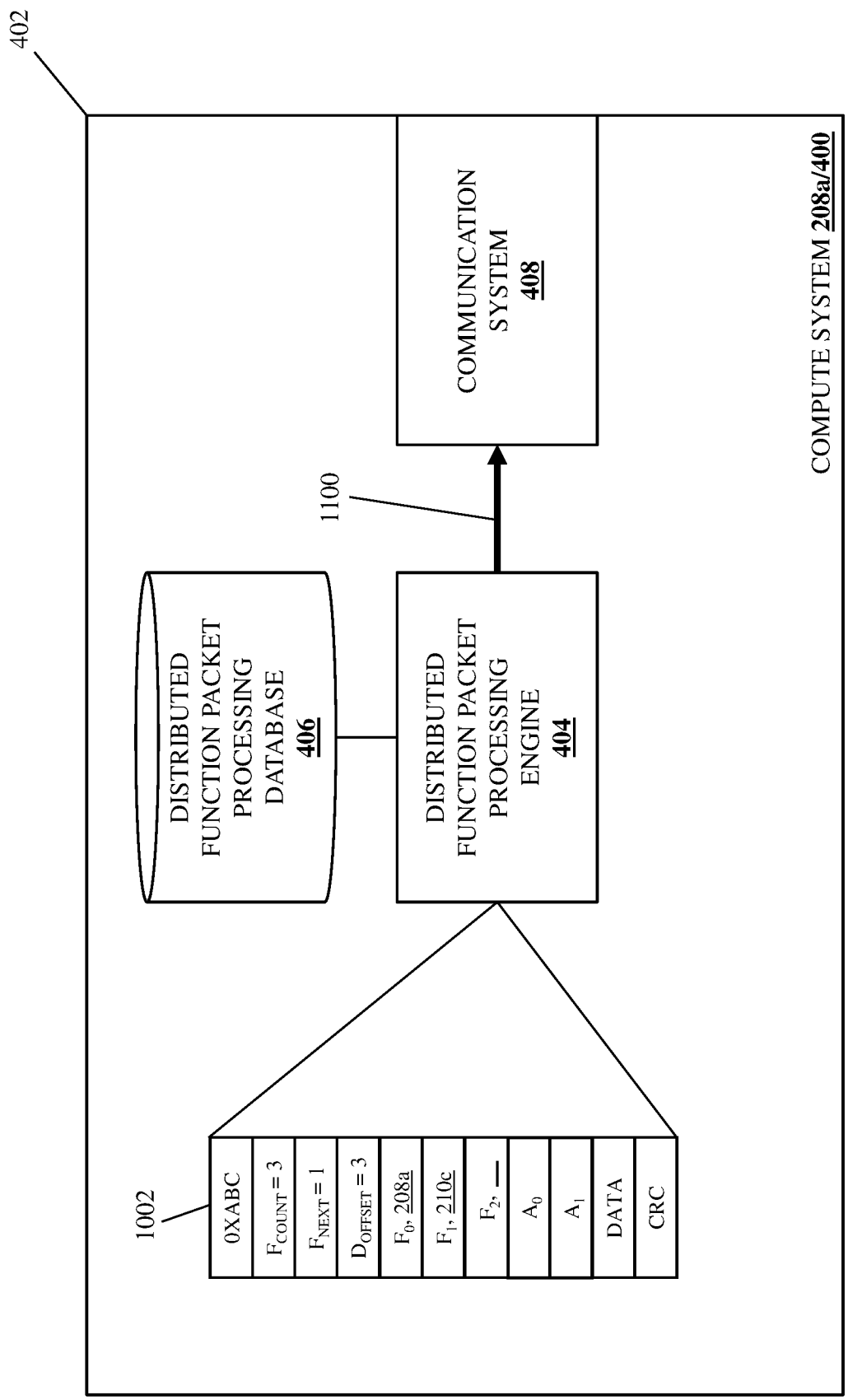
FIG. 11C is a schematic view illustrating an embodiment of the compute system of FIG. 4 operating during the method of FIGS. 5A and 5B.
Figure 11D:
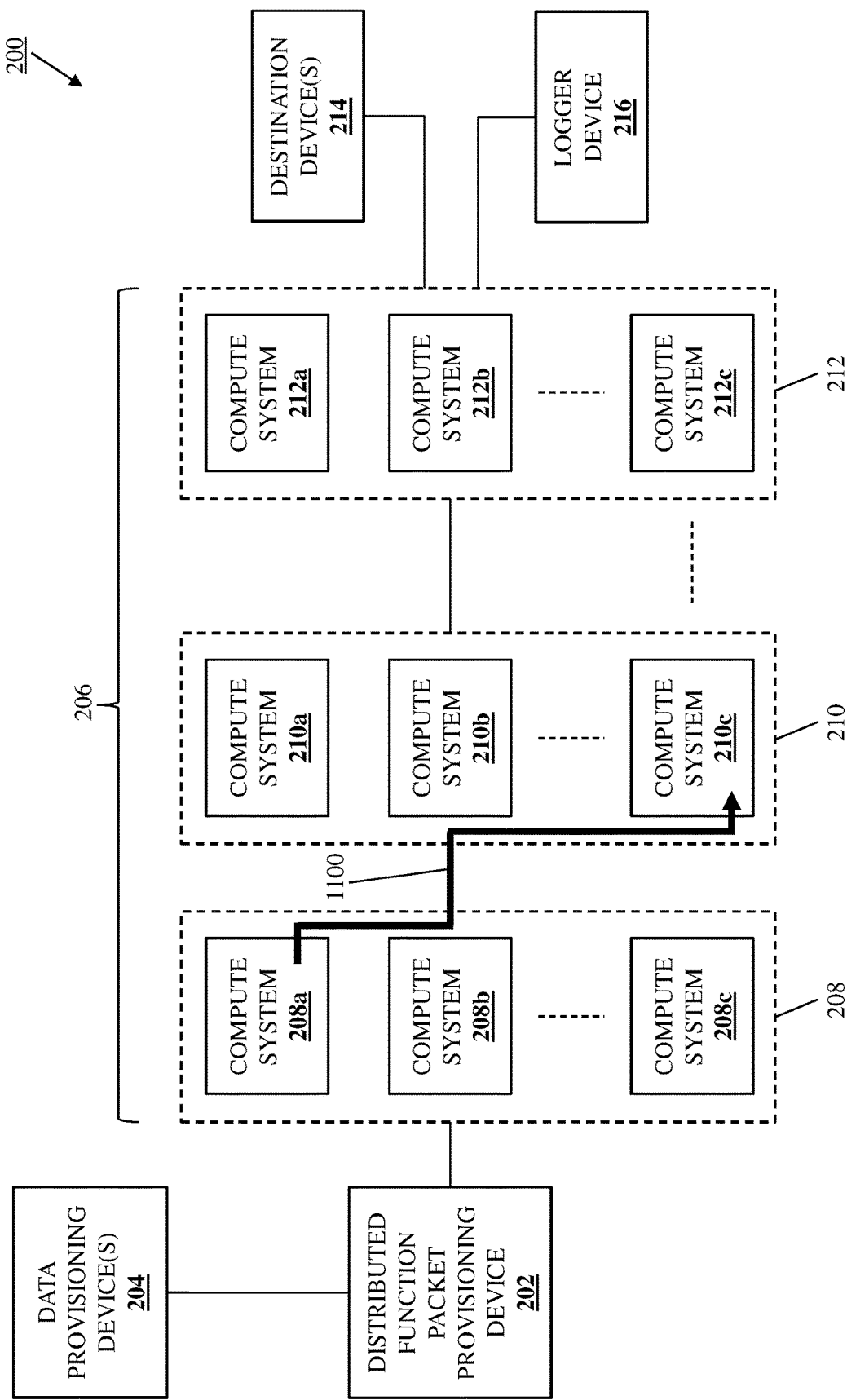
FIG. 11D is a schematic view illustrating an embodiment of the distributed function data transformation system of FIG. 2 operating during the method of FIGS. 5A and 5B.

With reference to FIG. 11B, in another embodiment of block 520, the distributed function packet processing engine 404 in the compute system 208a/400 may determine that a compute system for performing the second function ("F$_1$") is not defined in the function section of the distribute function packet 1002 based on the second function ("F$_1$") being associated with a compute system placeholder in the second function identifier/compute system placeholder ("F$_1$, _____") included in the function section of the distributed function packet 1002. In response, the distributed function packet processing engine 404 may then determine a compute system that may perform the second function ("F$_1$") (e.g., the compute system 210c in the example below), and may then identify that compute system in the second function identifier/compute system placeholder ("F$_1$, 210c"), as illustrated in FIG. 11C. For example, similarly as described above as being performed by the distributed function packet provisioning system 202 and prior to transmitting the distributed function packet 1002, the distributed function packet processing engine 404 in the compute system 208a/400 may identify the second function identified in the second function identifier/compute system placeholder ("F$_1$, _____"), and then may determine that the compute system 210c in the second compute system fabric portion 210 is configured to perform that second function optimally relative to the rest of the compute systems 210a-210b in the second compute system fabric portion 210 and, in response, may provide a compute system identifier for the compute system 210c in the second function identifier/compute system placeholder ("F$_1$, 210c").

In a specific example, the determination that the compute system 210c in the second compute system fabric portion 210 is configured to perform that second function optimally relative to the rest of the compute systems 210a-210b in the second compute system fabric portion 210 may include querying or accessing a registry (e.g., in the distributed function packet provisioning system 202, coupled to a network, etc.) that identifies the compute systems 210a-210c in the second compute system fabric portion 210 and their corresponding functions. As such, in some examples, the distributed function packet provisioning system 202 may communicate with any "current" compute systems in the compute fabric 206 to identify "subsequent" compute systems for performing functions identified in the distributed function packet 1000 or 1002.

As will be appreciated by one of skill in the art in possession of the present disclosure, the distributed function packet processing engine 404 in the compute system 208a/400 may update the data identifier ("DATA") in the distributed function packet 1000 or 1002 in order to identify the first transformed data generated via the performance of the first function. As will be appreciated by one of skill in the art in possession of the present disclosure, the updating of the data identifier to identify the first transformed data may include providing that first transformed data in the payload section of the distributed function packet 1000 or 1002 (e.g., in addition to the data originally provided in payload section of the distributed function packet 1000 or 1002 by the distributed function packet provisioning device 202, or in place of the data), or identifying a location of the first transformed data by providing a pointer to a storage location of that first transformed data in the payload section of the distributed function packet 1000 or 1002 (e.g., a storage location in which the compute system 208a stored the first transformed data subsequent to generating it).

As illustrated in FIGS. 11A, 11B, and 11C, in some embodiments, prior to transmitting the distributed function packet 1000 or 1002 and in response to having used the third argument ("A$_2$") to perform the first function ("F$_0$"), the distributed function packet processing engine 404 in the compute system 208a/400 may remove the third argument ("A$_2$") from the arguments section of the distributed function packet 1000 or 1002. However, while an argument used in performing a function is discussed as being removed from the distributed function packet 1000 or 1002 following the performance of that function, one of skill in the art in possession of the present disclosure will appreciate how such arguments may be left in the distributed function packet 1000 or 1002 in order to provide a record of the transformation of the data (discussed in further detail below) and for other purposes that would be apparent to one of skill in the art in possession of the present disclosure.

The method 500b then proceeds to block 522 where the current compute system transmits the distributed function packet to the subsequent compute system. With reference to FIGS. 11A, 11C, 11D, and 11E, in an embodiment of block 522, the distributed function packet processing engine 404 in the compute system 208a/400 may perform distributed function packet transmission operations 1100 that may include transmitting the distributed function packet 1000 or 1002 via its communication system 408 and to the compute system 210c in the second compute system fabric portion 210 such that it is received by the distributed function packet processing engine 404 in the compute system 210c/400 via its communication system 408. The method 500b then returns to block 510 and, as discussed above, the compute system 210c becomes the "current compute system" referenced in the subsequent performance of the method 500b. As such, the method 500b may loop such that, as long as the current function is not the final function in the function section of the distributed function packet 1000 or 1002, each compute system that receives that distributed function packet will perform a corresponding function on the data associated with that distributed function packet 1000 or 1002, and then transmit that distributed function packet 1000 or 1002 to another compute system in the compute system fabric 206.

For example, at block 510 of the second iteration of the method 500b and similarly as described above, the distributed function packet processing engine 404 in the compute system 210c/400 may identify the function performance identifier (e.g., "F$_{NEXT}$=1") in the metadata portion of the distributed function packet 1000 or 1002 to identify the second function ("F$_1$") in the function section of the distributed function packet 1000 or 1002. At block 512 of the second iteration of the method 500b and similarly as described above, the distributed function packet processing engine 404 in the compute system 210c/400 may then perform the second function ("F$_1$") on the first transformed data ("DATA") identified in the distributed function packet 1000 or 1002. As discussed above, the second function ("F$_1$") performed on the first transformed data by the compute system 210c at block 512 may include any of a variety of data transformations that one of skill in the art in possession of the present disclosure will recognize as being configured to transform data. For example, the distributed function packet processing engine 404 in the compute system 210c/400 may retrieve the first argument ("A$_0$") and the second argument ("A$_1$") from the argument section of the distributed function packet 1000 or 1002, and use the first and second arguments ("A$_0$" and "A$_1$") in performing the second function ("F$_1$") on the data in order to generate second transformed data. In a specific example, the second function ("$F_1$") may provide for the resizing of an image provided by image data, and the first and second arguments may include a height and a width that the image should be resized to As discussed below, the second transformed data may then be stored in a storage location accessible to the compute system 210c, or may be provided in the distributed function packet 1000 or 1002 by the compute system 210c (e.g., in addition to original data, in place of the original data, etc.) for transmission.

Figure 12A:
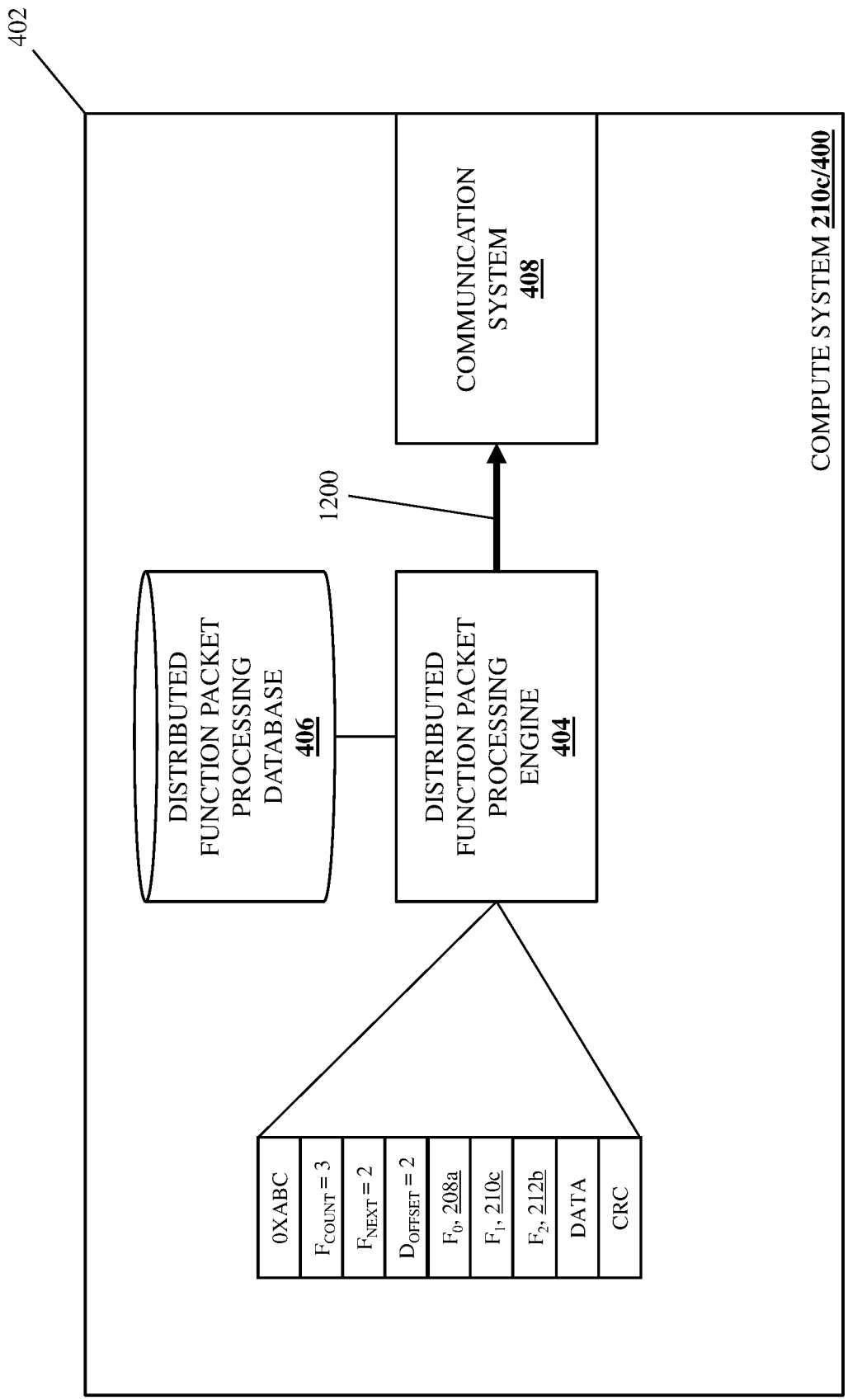
FIG. 12A is a schematic view illustrating an embodiment of the compute system of FIG. 4 operating during the method of FIGS. 5A and 5B.
Figure 12B:
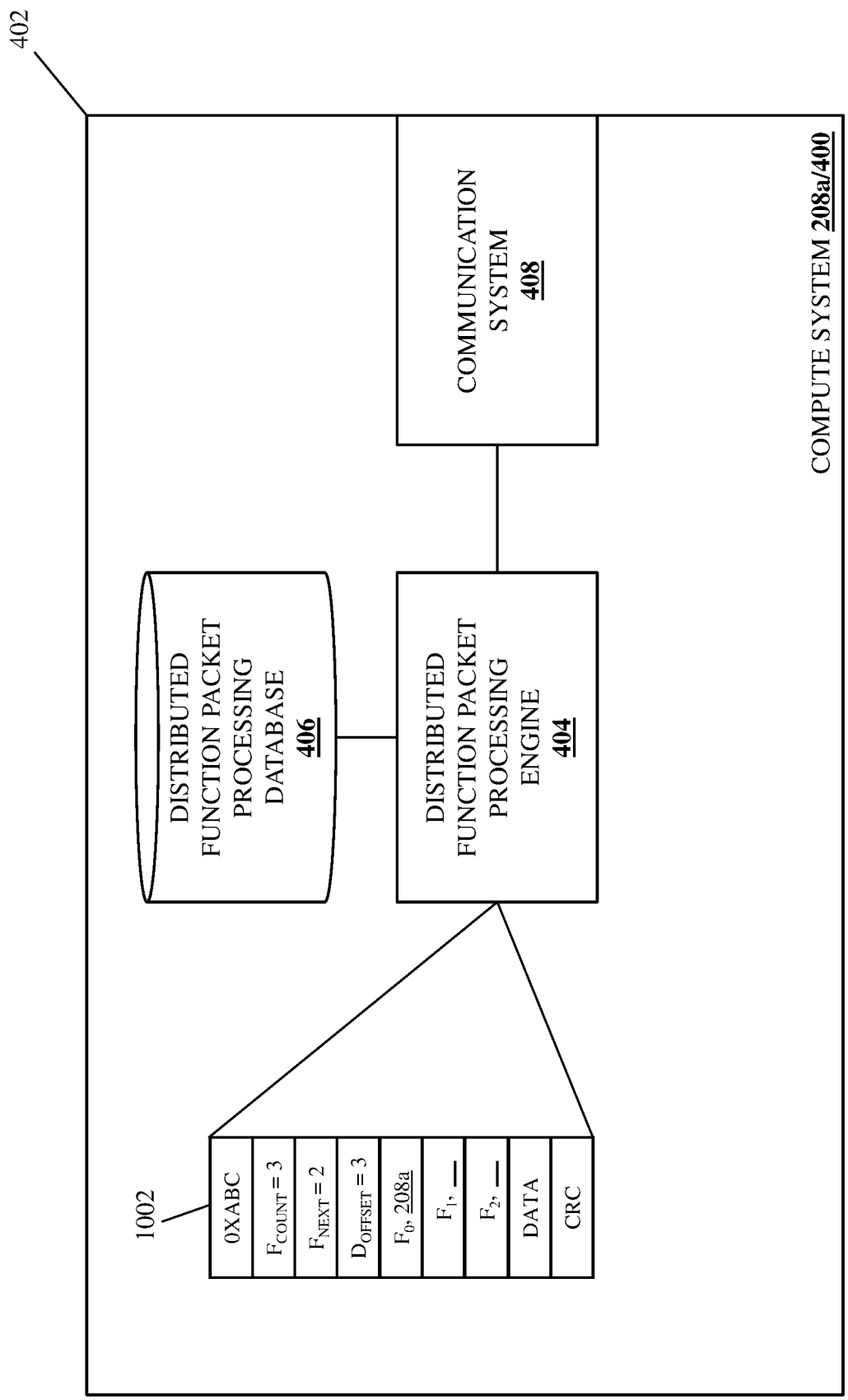
FIG. 12B is a schematic view illustrating an embodiment of the compute system of FIG. 4 operating during the method of FIGS. 5A and 5B.

At decision block 514 of the second iteration of the method 500b and similarly as described above, the distributed function packet processing engine 404 in the compute system 210c/400 may determine that the second function ("$F_1$") performed at block 512 is not the final function in the function section of the distributed function packet 1000 or 1002, and at block 516 the distributed function packet processing engine 404 in the compute system 210c/400 may then increment the function performance identifier ("$F_{NEXT}$") in the metadata section of the distributed function packet 1000 or 1002 (e.g., from "$F_{NEXT}=1$" to "$F_{NEXT}=2$"). With reference to FIG. 12A, in an embodiment of block 518 of the second iteration of the method 500b and similarly as described above, the distributed function packet processing engine 404 in the compute system 210c/400 may use the function performance identifier (e.g., "$F_{NEXT}=2$") in the metadata section of the distributed function packet 1000 to identify a third function ("$F_2$") in the third function identifier/compute system identifier ("$F_2$, 212b") included in the function section of the distributed function packet 1000. With reference to FIG. 12B, in another embodiment of block 518 of the second iteration of the method 500b and similarly as described above, the distributed function packet processing engine 404 in the compute system 210c/400 may use the function performance identifier (e.g., "$F_{NEXT}=2$") in the metadata section of the distributed function packet 1002 to identify a third function ("$F_2$") in the third function identifier/compute system placeholder ("$F_2$, _____") included in the function section of the distributed function packet 1002.

With reference to FIG. 12A, in an embodiment of block 520 of the second iteration of the method 500b and similarly as described above, the distributed function packet processing engine 404 in the compute system 210a/400 may identify the compute system 212b for performing the third function ("$F_2$") based on that compute system 212b being associated with the third function ("$F_2$") in the third function identifier/compute system identifier ("$F_2$, 212b") included in the function section of the distributed function packet 1000.

Figure 12C:
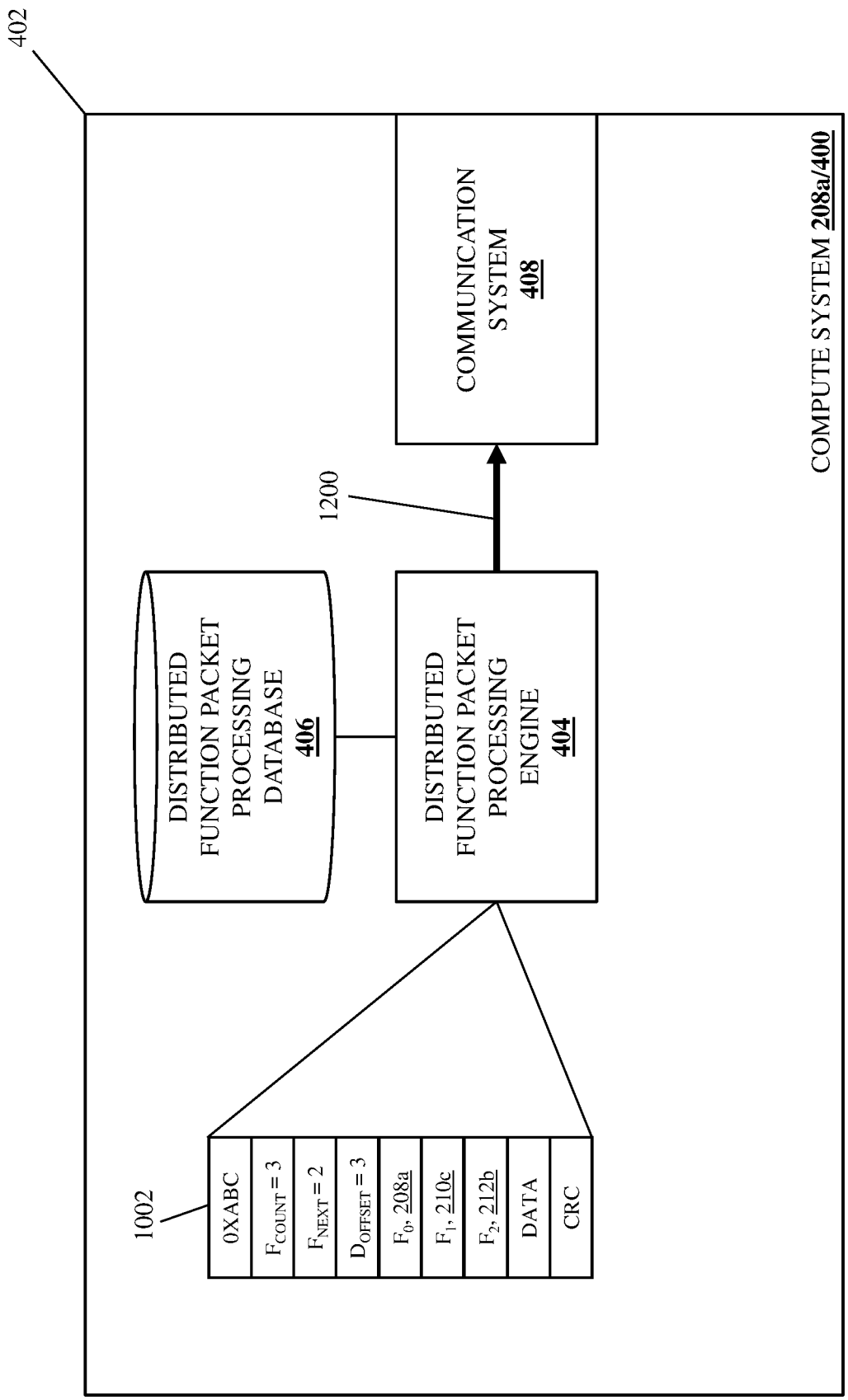
FIG. 12C is a schematic view illustrating an embodiment of the compute system of FIG. 4 operating during the method of FIGS. 5A and 5B.
Figure 12D:
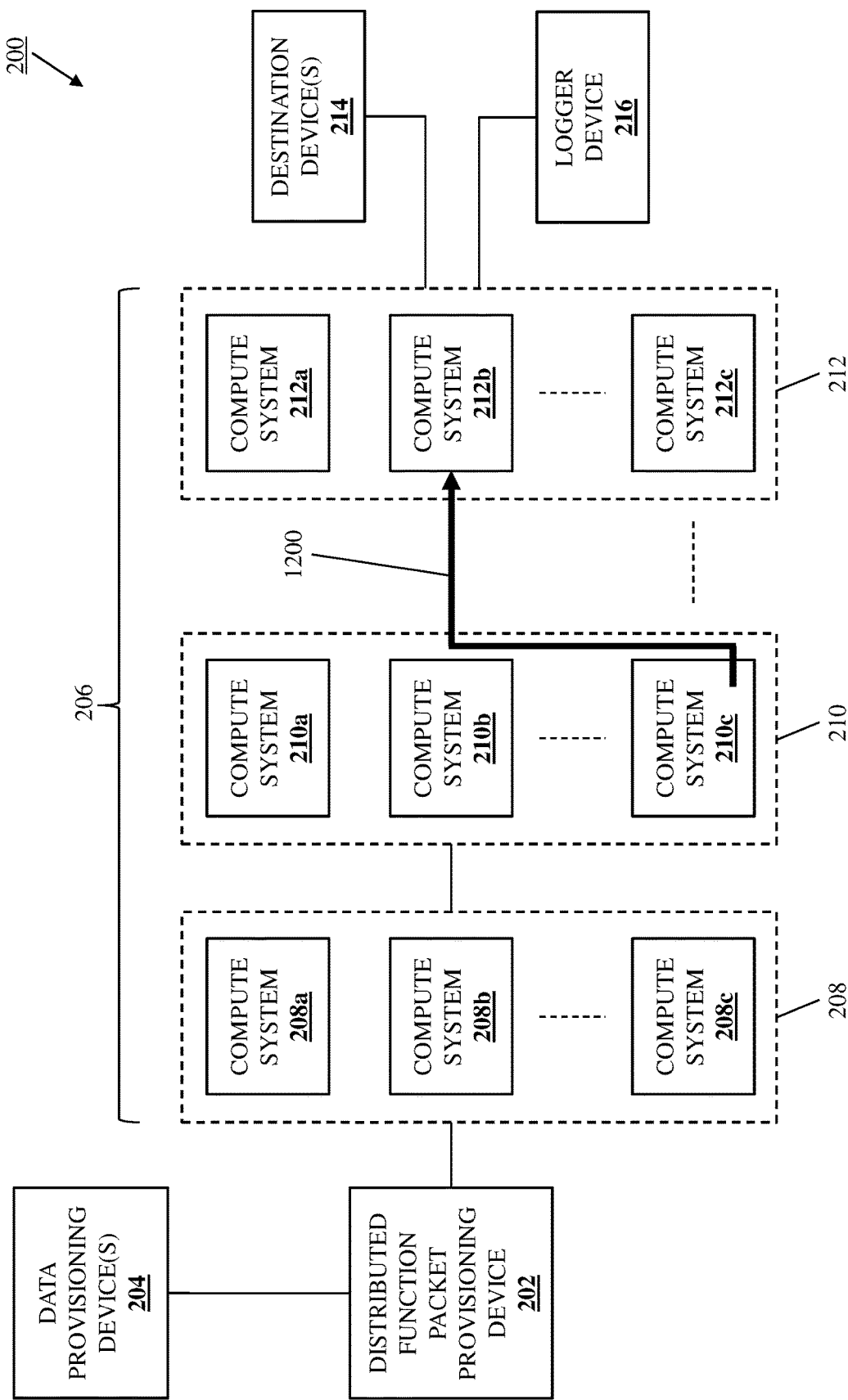
FIG. 12D is a schematic view illustrating an embodiment of the distributed function data transformation system of FIG. 2 operating during the method of FIGS. 5A and 5B.
Figure 12E:
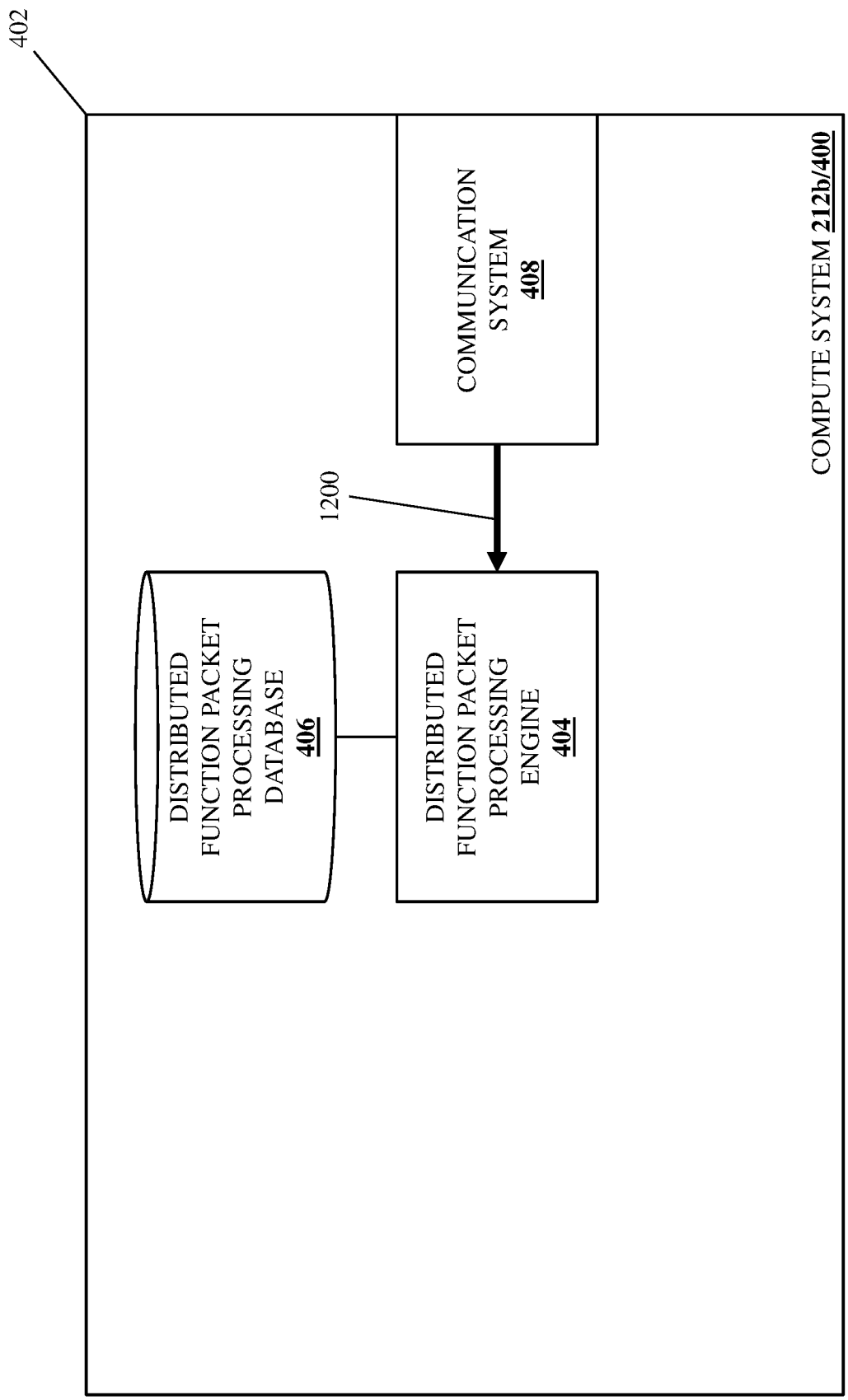
FIG. 12E is a schematic view illustrating an embodiment of the compute system of FIG. 4 operating during the method of FIGS. 5A and 5B.

With reference to FIG. 12B, in another embodiment of block 520 of the second iteration of the method 500b and similarly as described above, the distributed function packet processing engine 404 in the compute system 210c/400 may determine that a compute system for performing the third function ("$F_2$") is not defined in the function section of the distribute function packet 1002 based on the third function ("$F_2$") being associated with a compute system placeholder in the third function identifier/compute system placeholder ("$F_2$, _____") included in the function section of the distributed function packet 1002. In response, the distributed function packet processing engine 404 in the compute system 210c/400 may then determine a compute system that may perform the third function ("$F_2$") (e.g., the compute system 212b in the example below), and identify that compute system in the third function identifier/compute system placeholder ("$F_2$, 212b"), as illustrated in FIG. 12C. For example, similarly as described above as being performed by the distributed function packet provisioning system 202 and prior to transmitting the distributed function packet 1002, the distributed function packet processing engine 404 may identify the third function identified in the third function identifier/compute system placeholder ("$F_2$, _____"), and then may determine that the compute system 212b in the third compute system fabric portion 212 is configured to perform that third function optimally relative to the rest of the compute systems 212a-212c in the third compute system fabric portion 212 and, in response, may provide a compute system identifier for the compute system 212b in the third function identifier/compute system placeholder ("$F_2$, 212b").

In a specific example, the determination that the compute system 212b in the third compute system fabric portion 212 is configured to perform that third function optimally relative to the rest of the compute systems 212a-212c in the third compute system fabric portion 212 may include querying or accessing a registry (e.g., in the distributed function packet provisioning system 202, coupled to a network, etc.) that identifies the compute systems 212a-212c in the third compute system fabric portion 212 and their corresponding functions. As such, in some examples, the distributed function packet provisioning system 202 may communicate with any "current" compute systems in the compute fabric 206 to identify "subsequent" compute systems for performing functions identified in the distributed function packet 1000 or 1002.

As will be appreciated by one of skill in the art in possession of the present disclosure, the distributed function packet processing engine 404 in the compute system 210c/400 may update the data identifier ("DATA") in the distributed function packet 1000 or 1002 in order to identify the second transformed data generated via the performance of the second function. As will be appreciated by one of skill in the art in possession of the present disclosure, the updating of the data identifier to identify the second transformed data may include providing that second transformed data in the payload section of the distributed function packet 1000 or 1002 (e.g., in addition to the data originally provided in payload section of the distributed function packet 1000 or 1002 by the distributed function packet provisioning device 202 and the first transformed data provided in the payload section of the distribute function packet 1000 or 1002 by the compute system 208a, or in place of the original data/first transformed data), or identifying a location of the second transformed data by providing a pointer to a storage location of that second transformed data in the payload section of the distributed function packet 1000 or 1002 (e.g., a storage location in which the compute system 210c stored the second transformed data subsequent to generating it).

As illustrated in FIGS. 12A, 12B, and 12C, in some embodiments, prior to transmitting the distributed function packet 1000 or 1002 and in response to having used the first and second arguments ("$A_0$" and "$A_1$") to perform the second function ("$F_1$"), the distributed function packet processing engine 404 in the compute system 210c/400 may remove the first and second arguments ("$A_0$" and "$A_1$") from the arguments section of the distributed function packet 1000 or 1002. However, while arguments used in performing a function are discussed as being removed from the distributed function packet 1000 or 1002 following the performance of that function, one of skill in the art in possession of the present disclosure will appreciate how such arguments may be left in the distributed function packet 1000 or 1002 in order to provide a record of the transformation of the data (discussed in further detail below) and for other purposes that would be apparent to one of skill in the art in possession of the present disclosure.

With reference to FIGS. 12A, 12C, 12D, and 12E, at block 522 of the second iteration of the method 500*b* and similarly as described above, the distributed function packet processing engine 404 in the compute system 210*c*/400 may perform distributed function packet transmission operations 1200 that may include transmitting the distributed function packet 1000 or 1002 via its communication system 408 and to the compute system 212*b* in the third compute system fabric portion 212 such that it is received by the distributed function packet processing engine 404 in the compute system 212*b*/400 via its communication system 408. The method 500*b* then returns to block 510 and, as discussed above, the compute system 212*b* becomes the "current compute system" referenced in the subsequent performance of the method 500*b*.

For example, at block 510 of the third iteration of the method 500*b* and similarly as described above, the distributed function packet processing engine 404 in the compute system 212*b*/400 may identify the function performance identifier (e.g., "$F_{NEXT}$=2") in the metadata portion of the distributed function packet 1000 or 1002 to identify the third function ("$F_2$") in the function section of the distributed function packet 1000 or 1002. At block 512 of the third iteration of the method 500*b* and similarly as described above, the distributed function packet processing engine 404 in the compute system 212*b*/400 may then perform the third function ("$F_2$") on the second transformed data ("DATA") identified in the distributed function packet 1000 or 1002. As discussed above, the third function ("$F_2$") performed on the second transformed data by the compute system 212*b* at block 512 may include any of a variety of data transformations that one of skill in the art in possession of the present disclosure will recognize as being configured to transform data. In this example, the distributed function packet processing engine 404 in the compute system 212*b*/400 does not require any arguments from the arguments section of the distributed function packet 1000 or 10002 in performing the third function ("$F_2$") on the first transformed data in order to generate third transformed data. In a specific example, the third function ("$F_2$") may provide for the cropping and filtering of the image provided by image data to remove occlusions, and the transmission of the data to different models for particular analysis.

As will be appreciated by one of skill in the art in possession of the present disclosure, in this example, the third iteration of the method 500*b* performs the last function in the function section of the distributed function packet 1000 or 1002. Thus, one of skill in the art in possession of the present disclosure will appreciate how the method 500*b* allows a plurality of different compute systems that may have different processing resources to perform functions required to transform data in a sequence that allows those compute systems/processing resources to process that data most optimally. Furthermore, while a respective compute system is described as performing each function in the example above, one of skill in the art in possession of the present disclosure will appreciate how any compute system may perform multiple functions to transform data according to the teachings herein while remaining within the scope of the present disclosure as well.

Figure 13A:
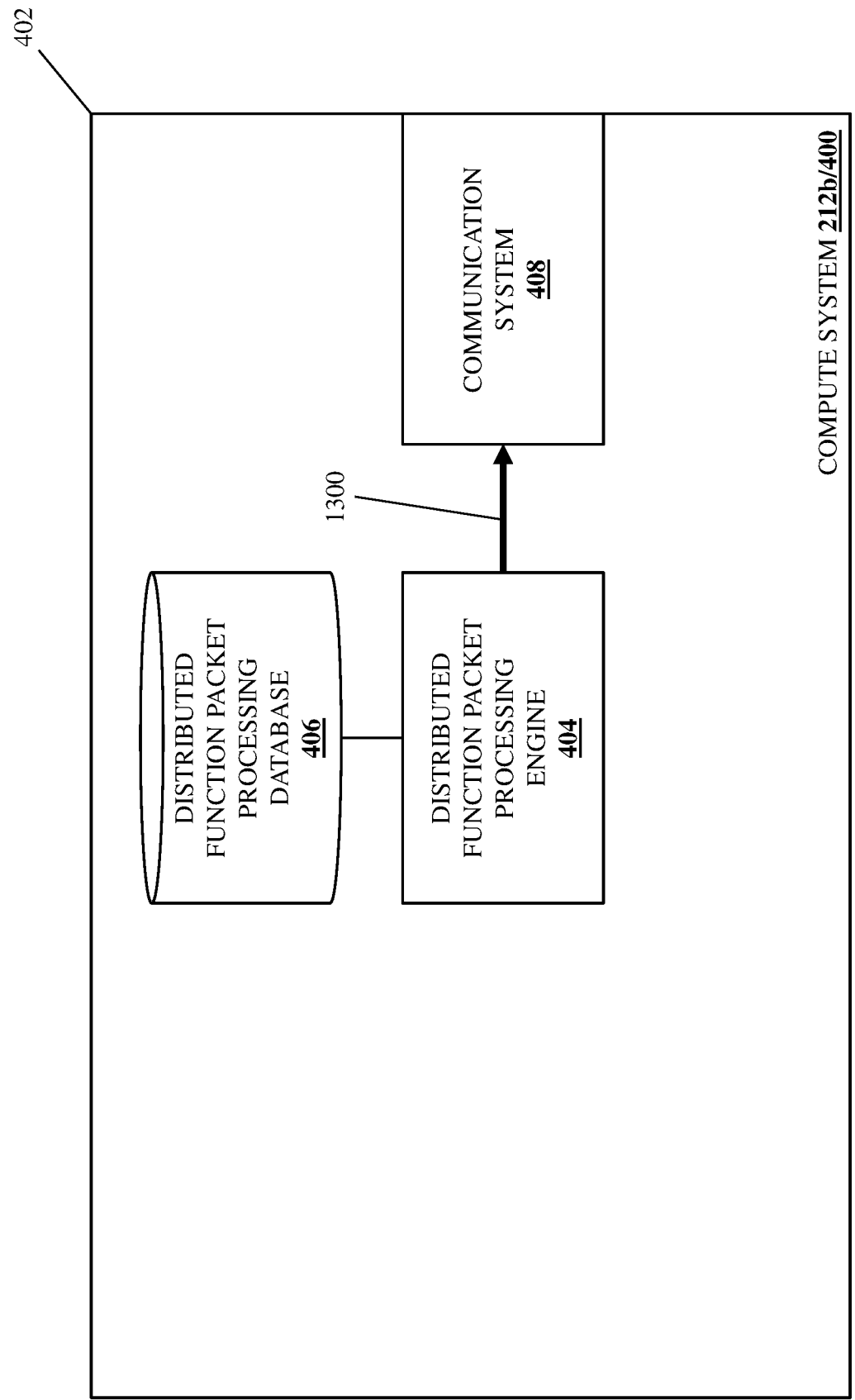
FIG. 13A is a schematic view illustrating an embodiment of the compute system of FIG. 4 operating during the method of FIGS. 5A and 5B.
Figure 13B:
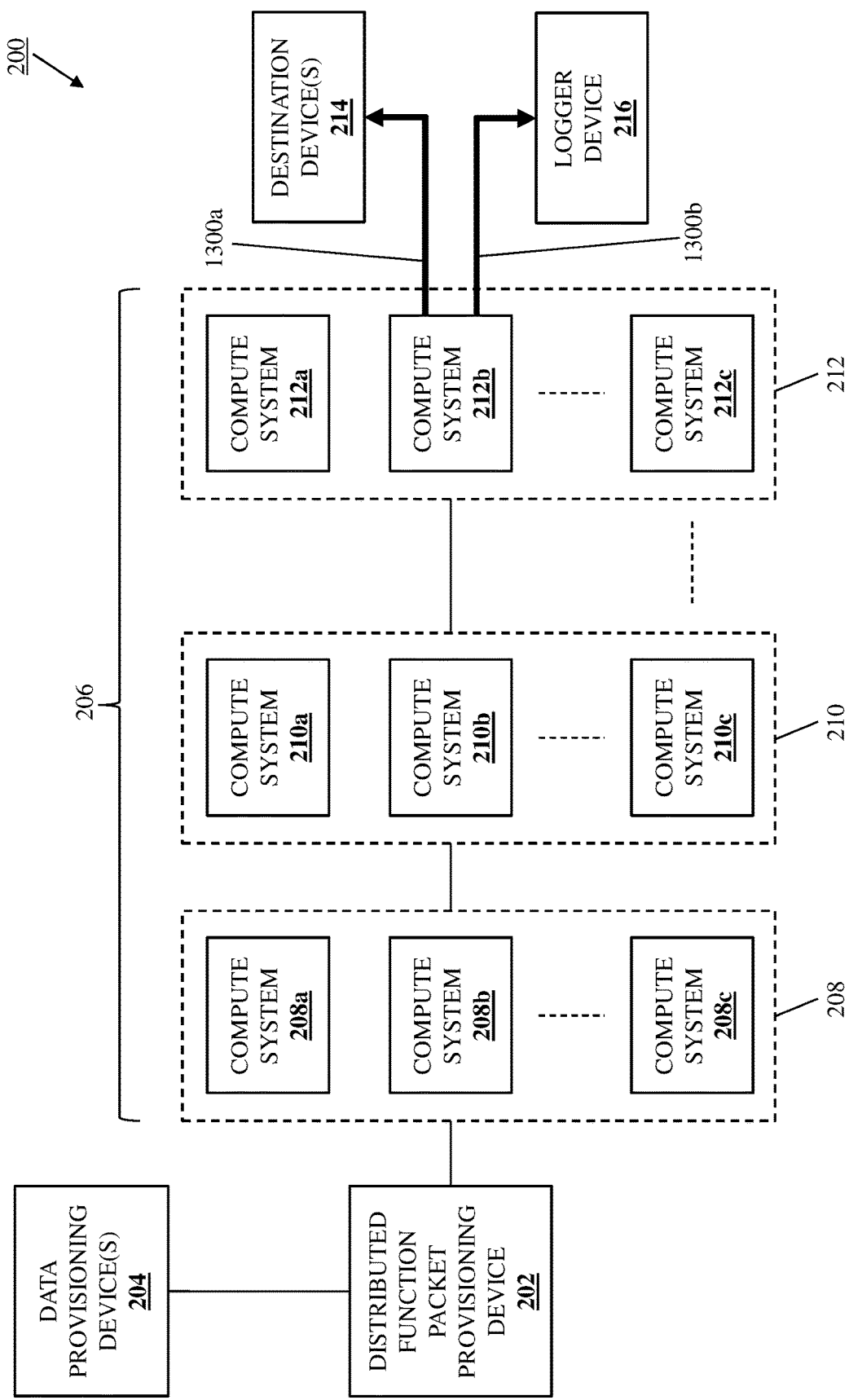
FIG. 13B is a schematic view illustrating an embodiment of the distributed function data transformation system of FIG. 2 operating during the method of FIGS. 5A and 5B.

If, at decision block 514, it is determined that the current function is the final function in the function list, the method 500*b* proceeds to block 524 where the current compute system transmits the transformed data to a destination device. With reference to FIGS. 13A and 13B, in an embodiment of block 524 and in response to determining that the third function ("$F_2$") is the last function in the function section of the distributed function packet 1000 or 1002, the distributed function packet processing engine 404 in the compute system 212*b*/400 may perform data transmission operations 1300 that may include transformed data transmission operations 1300*a* that transmit the third transformed data via its communication system 408 and to the destination device(s) 214. For example, the transformed data transmission operations 1300*a* may transmit the third transformed data to destination device(s) 214 such as storage devices, the data provisioning device(s) 204 that provided the original data that was transformed, and/or any other destination devices that would be apparent to one of skill in the art in possession of the present disclosure.

The method 500*b* may then proceed to optional block 526 where the current compute system may transmit the distributed function packet to a logger device. With reference to FIGS. 13A and 13B, in an embodiment of optional block 526, the data transmission operations 1300 may include data transformation information transmission operations 1300*b* that transmit information associated with the transformation of the original data to the third transformed data via its communication system 408 and to the logger device 216. For example, the data transformation information transmission operations 1300*b* may transmit the distributed data packet 1000 or 1002 to the logger device 216. As such, the logger device may log the distributed function packet 1000 or 1002 including its distributed function packet identifier, its function count identifier, its function performance identifier, its data offset identifier, its function identifier/compute system identifiers, its function identifier/compute system placeholders, its argument(s), its data identifier (including or identifying any of the original data, intermediate transformed data, and/or the final transformed data), its error correction data, and/or any other information that would be apparent to one of skill in the art in possession of the present disclosure. As such, while the arguments in the argument section of the distributed function packet 1000 or 1002 are described as being removed from the distributed function packet 1000 or 1002 in the examples above, those arguments may be kept in the distributed function packet 1000 or 1002 if the logging of such information is desired.

Thus, systems and methods have been described that provide for the generation of a distributed function packet (or "work" packet") that distributes data transformation operations for performing a data transformation or other work on data between a plurality of compute systems, with that distributed function packet including data transformation information that allows each of those compute systems to perform at least one predefined function associated with a corresponding data transformation operation, and then forward the distributed function packet to another of the compute systems if required. As will be appreciated by one of skill in the art in possession of the present disclosure, the systems and methods described herein allow data transformations requiring a sequence of data transformation operations to be optimally distributed for performance by compute systems in a compute system fabric, thus providing for optimized work distribution in the compute system fabric. As described above, the systems and methods of the present disclosure allow the provisioning of a relatively simple compute system fabric with compute systems configured to perform predefined functions, while either allocating resources from those compute systems to perform data transformation operations when a distributed function packet is created, or dynamically allocating resources from compute systems as each function is to-be performed (which allows such resource allocations to be delayed until needed and allows the systems and methods to respond in real time to resource demands in a dynamically changing compute system fabric).

Furthermore, one of skill in the art in possession of the present disclosure will recognize how the systems and methods of the present disclosure allow the insertion of data transformation operations into a data transformation pipeline in order to provide proactive data transformations. For example, any compute system receiving the distributed function packet as described above may determine one or more functions to perform on the data (e.g., the original data, the transformed data, etc.) associated with the distributed function packet, and may modify the distributed function packet to cause compute system(s) to perform those function(s). In a specific example, a compute system receiving the distributed function packet may determine that a function identified for performance on its data will be performed optimally if "broken up" into sub-functions that may then be performed by different compute systems, and thus may modify that distributed function packet to include those sub-functions (and in some embodiments, identify the compute systems configured to perform those sub-functions).

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A distributed function data transformation system, comprising: a plurality of compute systems; and a distributed function packet provisioning device that is coupled to the plurality of compute systems and that is configured to: receive a request to perform a data transformation that includes a plurality of data transformation operations; determine a respective function for performing each of the plurality of data transformation operations; generate a distributed function packet that includes: a function list that identifies the respective functions; a data identifier identifying data upon which the respective functions should be performed; and a function performance identifier that is configured to identify one of the respective functions that should be performed on the data; transmit the distributed function packet to a first compute system that is included in the plurality of compute systems, wherein the distributed function packet is configured to cause the first compute system to perform a first function in the function list identified by the function performance identifier on first data identified by the data identifier to generate first transformed data, modify the function performance identifier to identify a second function in the function list, and transmit the distributed function packet to a second compute system included in the plurality of compute systems, and wherein the distributed function packet is configured to cause the second compute system to perform the second function in the function list identified by the function performance identifier on the first transformed data identified by the data identifier to generate second transformed data, and transmit the distributed function packet towards its destination.

2. The system of claim 1, wherein the function performance identifier is configured to be incremented by the first compute system to modify the function performance identifier from identifying the first function to identifying the second function.

3. The system of claim 1, wherein the distributed function packet generated by the distributed function packet provisioning device includes: a respective compute system identifier associated with each respective function identified in the function list, wherein a first compute system identifier associated with the first function identified in the function list identifies the first compute system, and wherein a second compute system identifier associated with the second function identified in the function list identifies the second compute system.

4. The system of claim 1, wherein the distributed function packet generated by the distributed function packet provisioning device includes: an argument list that includes at least one argument for use in performing at least one of the respective functions, wherein the argument list is configured to cause the first compute system to perform the first function on the data identified by the data identifier using a first argument included in the at least one argument.

5. The system of claim 1, wherein the distributed function packet provisioning device is configured to: receive, from the first compute system, a request to identify one of the plurality of compute systems that is configured to perform the second function; and transmit, to the first compute system, a second compute system identifier for the second compute system that is configured to cause the first compute system to transmit the distributed function packet to the second compute system.

6. The system of claim 1, wherein the data is included in the distributed function packet.

7. An Information Handling System (IHS), comprising: a processing system; and a memory system that is coupled to the processing system and that includes instructions that, when executed by the processing system, cause the processing system to provide a distributed function packet provisioning engine that is configured to: receive a request to perform a data transformation that includes a plurality of data transformation operations; determine a respective function for performing each of the plurality of data transformation operations; generate a distributed function packet that includes: a function list that identifies the respective functions; a data identifier identifying data upon which the respective functions should be performed; and a function performance identifier that is configured to identify one of the respective functions that should be performed on the data; transmit the distributed function packet to a first compute system, wherein the distributed function packet is configured to cause the first compute system to perform a first function in the function list identified by the function performance identifier on first data identified by the data identifier to generate first transformed data, modify the function performance identifier to identify a second function in the function list, and transmit the distributed function packet to a second compute system, and wherein the distributed function packet is configured to cause the second compute system to perform the second function in the function list identified by the function performance identifier on the first transformed data identified by the data identifier to generate second transformed data, and transmit the distributed function packet towards its destination.

8. The IHS of claim 7, wherein the function performance identifier is configured to be incremented by the first compute system to modify the function performance identifier from identifying the first function to identifying the second function.

9. The IHS of claim 7, wherein the distributed function packet generated by the distributed function packet provisioning engine includes: a respective compute system identifier associated with each respective function identified in the function list, wherein a first compute system identifier associated with the first function identified in the function list identifies the first compute system, and wherein a second compute system identifier associated with the second function identified in the function list identifies the second compute system.

10. The IHS of claim 7, wherein the distributed function packet generated by the distributed function packet provisioning device includes: an argument list that includes at least one argument for use in performing at least one of the respective functions, wherein the argument list is configured to cause the first compute system to perform the first function on the data identified by the data identifier using a first argument included in the at least one argument.

11. The IHS of claim 7, wherein the distributed function packet provisioning engine is configured to: receive, from the first compute system, a request to identify a compute system that is configured to perform the second function; and transmit, to the first compute system, a second compute system identifier for the second compute system that is configured to cause the first compute system to transmit the distributed function packet to the second compute system.

12. The IHS of claim 7, wherein the data is included in the distributed function packet.

13. The IHS of claim 7, wherein the data identifier identifies the data by identifying a storage location of the data that is located outside of the distributed function packet.

14. A method for transforming data using distributed functions, comprising: receiving, by a distributed function packet provisioning device, a request to perform a data transformation that includes a plurality of data transformation operations; determining, by the distributed function packet provisioning device, a respective function for performing each of the plurality of data transformation operations; generating, by the distributed function packet provisioning device, a distributed function packet that includes: a function list that identifies the respective functions; a data identifier identifying data upon which the respective functions should be performed; and a function performance identifier that is configured to identify one of the respective functions that should be performed on the data; transmitting, by the distributed function packet provisioning device, the distributed function packet to a first compute system, wherein the distributed function packet is configured to cause the first compute system to perform a first function in the function list identified by the function performance identifier on first data identified by the data identifier to generate first transformed data, modify the function performance identifier to identify a second function in the function list, and transmit the distributed function packet to a second compute system, and wherein the distributed function packet is configured to cause the second compute system to perform the second function in the function list identified by the function performance identifier on the first transformed data identified by the data identifier to generate second transformed data, and transmit the distributed function packet towards its destination.

15. The method of claim 14, wherein the function performance identifier is configured to be incremented by the first compute system to modify the function performance identifier from identifying the first function to identifying the second function.

16. The method of claim 14, wherein the distributed function packet generated by the distributed function packet provisioning engine includes: a respective compute system identifier associated with each respective function identified in the function list, wherein a first compute system identifier associated with the first function identified in the function list identifies the first compute system, and wherein a second compute system identifier associated with the second function identified in the function list identifies the second compute system.

17. The method of claim 14, wherein the distributed function packet generated by the distributed function packet provisioning device includes: an argument list that includes at least one argument for use in performing at least one of the respective functions, wherein the argument list is configured to cause the first compute system to perform the first function on the data identified by the data identifier using a first argument included in the at least one argument.

18. The method of claim 14, further comprising: receiving, by the distributed function packet provisioning device from the first compute system, a request to identify a compute system that is configured to perform the second function; and transmitting, by the distributed function packet provisioning device to the first compute system, a second compute system identifier for the second compute system that is configured to cause the first compute system to transmit the distributed function packet to the second compute system.

19. The method of claim 14, wherein the data is included in the distributed function packet.

20. The method of claim 14, wherein the data identifier identifies the data by identifying a storage location of the data that is located outside of the distributed function packet.

* * * * *